(12) United States Patent
Ichikawa et al.

(10) Patent No.: US 7,674,535 B2
(45) Date of Patent: Mar. 9, 2010

(54) MAGNETIC TRANSFER MASTER DISK, ITS MANUFACTURING METHOD AND MAGNETIC TRANSFER METHOD

(75) Inventors: Kenji Ichikawa, Odawara (JP); Shiho Kamisawa, Odawara (JP); Seiji Kasahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 956 days.

(21) Appl. No.: 11/347,326

(22) Filed: Feb. 6, 2006

(65) Prior Publication Data

US 2006/0177699 A1 Aug. 10, 2006

(30) Foreign Application Priority Data

Feb. 8, 2005 (JP) ............... 2005-031958
Feb. 16, 2005 (JP) ............... 2005-039703

(51) Int. Cl.
G11B 5/66 (2006.01)
G11B 5/851 (2006.01)
G11B 5/858 (2006.01)

(52) U.S. Cl. ........................ 428/826; 360/16
(58) Field of Classification Search ........... None
See application file for complete search history.

(56) References Cited

U.S. PATENT DOCUMENTS

| | | | | |
|---|---|---|---|---|
| 4,931,147 | A * | 6/1990 | Legierse et al. | 205/68 |
| 6,759,183 | B2 * | 7/2004 | Nagao et al. | 430/320 |
| 2001/0000745 | A1 * | 5/2001 | Kerfeld | 430/320 |
| 2001/0028964 | A1 | 10/2001 | Nagao et al. | |
| 2003/0011912 | A1 * | 1/2003 | Nishikawa et al. | 360/17 |
| 2003/0127007 | A1 | 7/2003 | Sakurai et al. | |
| 2003/0198833 | A1 | 10/2003 | Nagao et al. | |
| 2003/0228179 | A1 | 12/2003 | Yaomin et al. | |
| 2004/0058197 | A1 * | 3/2004 | Nakamura et al. | 428/694 MM |
| 2004/0180174 | A1 | 9/2004 | Niitsuma et al. | |
| 2004/0195687 | A1 | 10/2004 | Inoue et al. | |
| 2005/0042473 | A1 * | 2/2005 | Nishikawa et al. | 428/544 |
| 2005/0118534 | A1 * | 6/2005 | Oyake et al. | 430/321 |

(Continued)

FOREIGN PATENT DOCUMENTS

EP 0488239 A1 6/1992

(Continued)

OTHER PUBLICATIONS

Derwent Abstract Translation of WO-03058614A1 (Derwent ACC-No. 2003-598416).*

(Continued)

*Primary Examiner*—Kevin M Bernatz
(74) *Attorney, Agent, or Firm*—Sughrue Mion, PLLC

(57) ABSTRACT

The present invention provides a magnetic transfer master disk comprising: a master substrate formed by a metal plate, on a surface of which a protruding and recessed pattern corresponding to transfer information is transferred by electroforming, the metal plate being composed of two or more electroforming layers that are different from each other in crystal orientation; and a magnetic layer formed on the protruding and recessed pattern of the master substrate in order to eliminate warpage and distortion of the master disk even if the close contact pressure is increased during transferring magnetic information such as format information to a magnetic disk used in a hard disk device and the like.

10 Claims, 12 Drawing Sheets

U.S. PATENT DOCUMENTS

2008/0143020 A1* 6/2008 Ichikawa et al. ............ 264/293
2008/0182134 A1* 7/2008 Hirayama et al. ........ 428/831.2

FOREIGN PATENT DOCUMENTS

| EP | 1132898 | A2 | 9/2001 |
| EP | 1132898 | A3 | 12/2005 |
| JP | 2001-256644 | A | 9/2001 |
| JP | 2006-216204 | A | 8/2006 |
| JP | 2006-221692 | A | 8/2006 |

OTHER PUBLICATIONS

Japanese Office Action issued in JP 2005-039703 dated Feb. 4, 2008.
Japanese Office Action issued in JP 2005-031958 dated Feb. 4, 2008.

* cited by examiner

MAGNETIC TRANSFER MASTER DISK, ITS MANUFACTURING METHOD AND MAGNETIC TRANSFER METHOD

BACKGROUND OF THE INVENTION

1. Field of the Invention

The present invention relates to a magnetic transfer master disk, its manufacturing method and a magnetic transfer method. More particularly, the present invention relates to a magnetic transfer master disk which is suitable for transferring magnetic information such as format information to a magnetic disk used in a hard disk device and the like, and also relates to a method for the manufacturing magnetic transfer master disk and a magnetic transfer method.

2. Description of the Related Art

Generally, a magnetic disk (hard disk) used in a hard disk drive which has become popular rapidly in recent years, is once delivered from a magnetic disk maker to a drive maker, and thereafter format information and address information are written in the magnetic disk before it is incorporated in the hard disk drive. The writing operation can be performed by using a magnetic head, but a method for collectively performing transfer from a master disk in which format information and address information are written, is efficient and preferred.

In the magnetic transfer method for collectively performing transfer in a state where a master disk and a disk to be transferred (slave disk) are brought into close contact with each other, the magnetic field generating device such as an electromagnet device and a permanent magnet device is provided on one face or both faces of the disks in close contact with each other, so that information (for example servo signal) provided for the master disk is transferred to the slave disk by applying a transfer magnetic field. Here, in order to accurately perform the magnetic transfer, it is extremely important to make the master disc closely contact with the slave disk uniformly without a gap.

As the master disc used for the magnetic transfer method, as disclosed in Japanese Patent Application Laid-Open No. 2001-256644, a disk in which a protruding and recessed pattern corresponding to an information signal is formed on the surface of a substrate and in which a magnetic layer is applied on the surface of the protruding and recessed pattern, is normally used. The magnetic transfer master disk is generally produced through a electroforming process for applying electroforming to an original plate on which information is formed by a protruding and recessed pattern and for laminating a metal plate composed of an electroforming layer on the original plate so as to make the protruding and recessed pattern transferred on the surface of the metal plate, through exfoliating the metal plate from the original plate, through a punching process for punching out the exfoliated metal plate into a predetermined size, and thereafter through a process for applying a magnetic layer on the surface of the protruding and recessed pattern.

SUMMARY OF THE INVENTION

However, the conventional master disk produced by the above described processes is not flat, but warped and distorted due to deformation caused at the time of the processing in the exfoliating process for exfoliating the metal plate from the original plate, the punching process for punching out the exfoliated metal plate into a predetermined size, and the like. Further, as a process after the electroforming process, there is a photoetching process in addition to the punching process. The photoetching process may cause warpage and distortion in the master disk. In the case where the warpage and distortion is caused in the master disk, there is a problem that the close contact state of the master disc and the slave disk cannot be improved, and hence, highly precise magnetic transfer cannot be performed.

As measures for this problem, in order to improve the close contact state of the master disk and the slave disk, such measures are taken that a shock absorbing material (cushion material) is provided on the rear face of the master disk, that close contact pressure is increased, and that air existing between the master disk and the slave disk is removed by vacuum suction. However, the problem of close contact between the master disk and the slave disk is not completely solved, and hence, it is necessary to improve the flatness of the master disk by eliminating warpage and distortion of the master disk. In addition, the increase in the close contact pressure may cause breakage and distortion of the protruding and recessed pattern of the master disc and cause to lower the durability of the master disk.

The present invention has been made in view of the above described circumstances. An object of the present invention is to provide a magnetic transfer master disk which has small amount of warpage and distortion, and which is excellent in flatness.

In order to achieve the above described object, according to a first aspect of the present invention, there is provided a magnetic transfer master disk comprising: a master substrate formed by a metal plate, on the surface of which a protruding and recessed pattern corresponding to transfer information is transferred by electroforming, the metal plate being composed of two or more electroforming layers that are different from each other in crystal orientation; and a magnetic layer formed on the protruding and recessed pattern of the master substrate.

In the case of manufacturing a master substrate, warpage and distortion of the master disk caused by deformation generated such as in the exfoliating process and the punching process, as described above, strongly depend upon crystal orientation of the electroforming layer (metal plate), and the warpage and distortion are easily generated so as to concentrate in a specific crystal orientation within the surface of the master disc, when the exfoliating and punching processing are performed.

According to the first aspect of the present invention, the electroforming layer constituting the metal plate is formed by two or more layers that are different from each other in crystal orientation, so that the sliding surface and the sliding direction is different for each layer and the internal stress (residual stress) inherent to each layer is also different for each layer. This enables the direction of deformation resistance to be different for each layer, when the exfoliating and punching operations are performed. Accordingly, the amount of deformation caused at the time when exfoliating and punching operations or photoetching is performed, can be reduced by making the electroforming layer composed of two or more layers that are different from each other in crystal orientation, so that it is possible to significantly suppress the occurrence of warpage and distortion. Noted that warpage and distortion of the master substrate may also occur in the photoetching process as a process other than the punching process which are performed after the electroforming and exfoliating processes, and hence, the present invention is effective as a measure against such problem in the photoetching process.

A second aspect of the present invention is characterized in that in the first aspect, each layer thickness of the two or more layers that are different from each other in crystal orientation, is different for each layer.

In the case where the deformation resistance of each of the two or more layers is attempted to be controlled only by crystal orientation, it is necessary to precisely control electroforming conditions because the crystal orientation is significantly affected by the time-based change of components in a plating solution and the like. According to the second aspect of the present invention, the deformation resistance of each of the layers is arranged to be controlled by both crystal orientation and layer thickness, so that it is possible to easily control electroforming conditions and to more precisely suppress the occurrence of warpage and distortion.

A third aspect of the present invention is characterized in that in the first aspect, the electroforming layer is a Ni electroforming layer composed of two layers.

This is because various kinds of metals can be used for the metal plate (electroforming layer) of the master substrate, but the Ni electroforming layer is preferably used for the metal plate.

A fourth aspect of the present invention is characterized in that in the third aspect, of the two Ni electroforming layers, the crystal orientation of the first layer constituting the protruding and recessed pattern surface side is preferentially oriented on Ni (220), and the crystal orientation of the second layer is preferentially oriented on Ni (200).

Here, the crystal orientation is assumed to be preferentially oriented in the crystal growth direction (thickness direction), and hence, also in analyzing the crystal orientation by Electron Back Scattered Diffraction (EBSD), the orientation is determined on the basis of Inverse pole figures (IPFs) in the thickness direction corresponding to the crystal growth direction.

According to the fourth aspect of the present invention, in the case where the electroforming layer is formed by the Ni electroforming layer composed of two layers, the crystal orientation of the first layer constituting the protruding and recessed pattern surface side is preferentially oriented on Ni (220) and the crystal orientation of the second layer is preferentially oriented on Ni (200), whereby it is possible to obtain a master disk having small amounts of warpage and distortion.

A fifth aspect of the present invention is characterized in that in the fourth aspect, of the two electroforming layers, when the layer thickness of the first layer constituting the protruding and recessed pattern surface side is set to a and the layer thickness of the second layer is set to b, a/b is in the range of 0.1 to 0.25.

The fifth aspect defines a relation between the thicknesses of the two layers, when the Ni electroforming layer is composed of the two layers, in which the crystal orientation of the first layer constituting the protruding and recessed pattern surface side is preferentially oriented on Ni (220) and the crystal orientation of the second layer is preferentially oriented on Ni (200). That is, when the layer thickness of the first layer constituting the protruding and recessed pattern surface side is set to a, and the layer thickness of the second layer is set to b, the thickness of the two layers is controlled to make a/b in the range of 0.1 to 0.25, so that a master disk with smaller amounts of warpage and distortion can be obtained.

A sixth aspect of the present invention is characterized in that in the first aspect, the amount of warpage of the magnetic transfer master disk is 50 μm or less in a master disc size of 2.5 inches.

Preferably, the amount of warpage of the master disc is 50 μm or less even in the master disk with the size of 2.5 inches, in order to secure a desirable close contact state between the master disk and a disk to be transferred, at the time of magnetic transfer. More preferably, the amount of warpage of the master disc is 30 μm or less in the master disk with the size of 2.5 inches. The amount of warpage of 50 μm or less can be achieved by an embodiment according to the above described first to fifth aspects.

The sixth aspect of the present invention defines the amount of warpage in the master disk with the size of 2.5 inches in which warpage is liable to be generated because of the large diameter size. However, the present invention is not limited to the case of the 2.5 inch size master disk. For example, the present invention can be applied to a master disk with sizes smaller than 2.5 inches, such as 0.85 inches, 1 inch and 1.8 inches. In this case, the amount of warpage can be further reduced in comparison with the case of the 2.5 inch size master disc.

In order to achieve the above described object, according to a seventh aspect of the present invention, there is provided a method for manufacturing a magnetic transfer master disk, comprising the steps of: applying electroforming processing on an original plate with information formed thereon by a protruding and recessed pattern, to laminate on the original plate a metal plate composed of two or more electroforming layers that are different from each other in crystal orientation, and to transfer the protruding and recessed pattern to the surface of the metal plate; exfoliating the metal plate from the original plate to make the metal plate into a master substrate; and forming a magnetic layer on the protruding and recessed pattern of the master substrate.

According to the seventh aspect of the present invention, in the electroforming process, the metal plate composed of two or more electroforming layers that are different from each other in crystal orientation, is arranged to be laminated on the original plate so as to make the protruding and recessed pattern transferred to the layer, as a result of which a magnetic transfer master disk with small amount of warpage and distortion can be manufactured.

Further, since the magnetic transfer master disk with small amount of warpage and distortion can be manufactured, the manufacturing yield can be improved.

An eighth aspect of the present invention is characterized in that in the seventh aspect, crystal orientation of each of the two or more layers, and layer thickness of each of the two or more layers, are both controlled in the electroforming process.

According to the eighth aspect, the deformation resistance of each layer is arranged to be controlled by both crystal orientation and layer thickness, so that electroforming conditions can be easily controlled and thereby the occurrence of warpage and distortion can be more precisely suppressed.

In order to achieve the above described object, according to a ninth aspect of the present invention, there is provided a magnetic transfer method comprising: a close contact process for making a disk to be transferred closely contact with the protruding and recessed pattern surface of one of the magnetic transfer master disks according to the first to sixth aspects; and a magnetic field applying process for applying a transfer magnetic field to the magnetic transfer master disk and the disk to be transferred which are made to be in close contact with each other, and for transferring the protruding and recessed pattern of the magnetic transfer master disk to the disk to be transferred.

According to the ninth aspect, the magnetic transfer processing is applied to the disk to be transferred by using the magnetic transfer master disk with small amount of warpage and distortion. Thereby, the effects of warpage and distortion of the master disk can be eliminated and the magnetic transfer can be performed in a desirable close contact state, as a result of which the transfer precision is improved.

As described above, as one of the measures to suppress the warpage and distortion, which is an object of the present invention, there is a method in which the electroforming layer constituting the metal plate is composed, for example, of two layers that are different from each other in crystal orientation, and in which the crystal orientation and the layer thickness relation of the two layers are controlled at the time of electroforming. That is, the two layer structure in which the two layers are different from each other in crystal orientation, makes the sliding surface and the sliding direction of the layers different for each layer, and also makes the internal stress (residual stress) inherent to the layers different for each layer. Thereby, the direction of the deformation resistance at the time when exfoliating and punching operations are performed, is different for each layer. Therefore, the amount of deformation caused when exfoliating and punching operations are performed, can be reduced by taking advantage of the difference in the deformation resistance of the two layers, as a result of which the occurrence of warpage and distortion of the master disk can be significantly suppressed.

However, in the case of the two layer structure, if the crystal orientation of the two layers can be highly precisely controlled at the time of electroforming, the thickness relation of the two layers can be controlled without difficulty. However, the crystal orientation depends upon current density of a plating bath and the current density fluctuates due to the time-based change of the plating bath. It is therefore necessary to precisely control the current density at the time of electroforming, in order to suppress warpage and distortion of the master disk by making the electroforming layer formed to have the two layer structure. The invention which will be described below is to solve the above described problem, and to provide a magnetic transfer master disk which has small amounts of warpage and distortion, and which is excellent in flatness.

In order to achieve the above described object, according to a tenth aspect of the present invention, there is provided a magnetic transfer master disk comprising: a master substrate with a three layer structure of electroforming layers constituting a metal plate, on the surface of which a protruding and recessed pattern corresponding to transfer information is transferred by electroforming, in which three layer structure a first layer and a third layer have a same crystal orientation, and a second layer with a crystal orientation different from the crystal orientation of the first layer and the third layer, is sandwiched between the first layer and the third layer; and a magnetic layer formed on the protruding and recessed pattern of the master substrate.

According to the tenth aspect of the present invention, the electroforming layer constituting the metal plate is formed as the three layer structure in which the second layer with the crystal orientation different from the crystal orientation of the first and third layers which have the same crystal orientation, is sandwiched between the first and second layers. As a result, two kinds of layers that are different from each other in crystal orientation, are provided for the electroforming layer, so that as described above, the deformation resistance at the time when exfoliating and punching operations or photoetching is performed, can be made different for each of the layers. Further, in the case of the three layer structure according to the present invention, the crystal orientation of two layers (the first layer and the third layer) constituting the front and rear faces of the electroforming layer is the same and the physical property of the two layers is also the same, so that a good balance of physical properties of the electroforming layer as a whole can be obtained. As a result, the resistance of the electroforming layer as a whole against warpage and deformation can be easily controlled by controlling the layer thickness relation between the first layer and the third layer. Consequently, precise control of the current density at the time of electroforming is not needed as in the case of the two layer structure. In the case of the above described two layer structure, the crystal orientation and the physical property of each of two layers respectively constituting the front and rear faces of the electroforming layer are different for each layer. Thus, when the resistance of the electroforming layer as a whole against warpage and deformation is attempted to be controlled, it is necessary to control the balance of the physical property of the electroforming layer as a whole both by the crystal orientation different for each of the two layers and by the layer thickness relation between the two layers. As a result, precise control of the current density in electroforming is needed.

An eleventh aspect of the present invention is characterized in that in the tenth aspect, the layer thickness of each of the first layer to the third layer which constitute the electroforming layer is different for each layer.

When the deformation resistance of each layer constituting the three layer structure is attempted to be controlled only by crystal orientation, it is necessary to precisely control electroforming conditions because the crystal orientation is strongly affected by the time-based change of components of the plating solution and the like. According to the eleventh aspect of the present invention, the deformation resistance of each of the layers are arranged to be controlled by both crystal orientation and layer thickness, so that electroforming conditions can be easily controlled and the generation of warpage and distortion can be more precisely suppressed.

A twelfth aspect of the present invention is characterized in that in the tenth aspect, the electroforming layer is a Ni electroforming layer.

This is because various kinds of metals can be used for the metal plate (electroforming layer) of the master substrate, but the Ni electroforming layer is more preferably used.

A thirteenth aspect of the present invention is characterized in that in the twelfth aspect, the crystal orientation of the first layer and the third layer is preferentially oriented on Ni (220), and the crystal orientation of the second layer is preferentially oriented on Ni (200). Here, the crystal orientation is preferentially oriented in the same manner as described above.

In the case where the three layer structure is formed by a Ni electroforming layer, the crystal orientation of the first layer on the front face side which constitutes the protruding and recessed pattern surface side and of the third layer on the rear face side is preferentially oriented on Ni (220), and the crystal orientation of the second layer (intermediate layer) sandwiched between the first layer and the third layer is preferentially oriented on Ni (200), as a result of which a master disk with small amounts of warpage and distortion can be obtained.

A fourteenth aspect of the present invention is characterized in that in the thirteenth aspect, when the layer thickness of the first layer is set to a, and the layer thickness of the third layer is set to c, the layer thickness relation that $a/(a+c)$ is within a range of 0.70 to 0.85, is satisfied.

The fourteenth aspect of the present invention defines the layer thickness relation between the first layer and the third layer, which have the same crystal orientation in the three layer structure, and hence, when the layer thickness of the first layer is set to a, and the layer thickness of the third layer is set to c, the layer thickness relation that $a/(a+c)$ is within a range of 0.70 to 0.85, is preferably established. This is because a master disk with still smaller amounts of warpage and distortion can be obtained.

A fifteenth aspect of the present invention is characterized in that in the fourteenth aspect, the above described layer thickness relation is satisfied, and the layer thickness of the third layer is 10 µm or more.

This is because the warpage of the master disc can be further suppressed, when the layer thickness relation of a/(a+c) in the fourteenth aspect is satisfied and the layer thickness of the third layer is set to 10 µm or more.

A sixteenth aspect of the present invention is characterized in that in the tenth aspect, the amount of warpage of the magnetic transfer master disk is 50 µm or less in the 2.5 inch size master disk.

Preferably, the amount of warpage of the master disk is 50 µm or less in the 2.5 inch size master disk, in order to secure a desirable close contact property between the master disk and a disk to be transferred at the time of magnetic transfer. The object of making the amount of warpage of the master disk 50 µm or less can be achieved by one of the tenth to the sixteenth aspects of the present invention. Noted that the amount of warpage of the master disk is more preferably 30 µm or less in the 2.5 inch size master disk.

The sixteenth aspect defines the amount of warpage of the 2.5 inch size master disk which has a large diameter size and warpage is liable to occur. However, the present invention is not limited to the case of the 2.5 inch size master disk. For example, the present invention can be applied to a master disk with sizes smaller than 2.5 inches, such as 0.85 inches, 1 inch and 1.8 inches. In this case, the amount of warpage can be further reduced in comparison with the 2.5 inch size master disc.

In order to achieve the above described objects, according to a seventeenth aspect of the present invention, there is provided a method for manufacturing a magnetic transfer master disk, comprising the steps of: applying electroforming processing on an original plate with information formed thereon by a protruding and recessed pattern, to laminate on the original plate a metal plate composed of an electroforming layer with a three layer structure in which a first layer and a third layer have a same crystal orientation, and in which a second layer with a crystal orientation different from the crystal orientation of the first layer and the third layer, is sandwiched between the first layer and the third layer, and to transfer the protruding and recessed pattern to the surface of the metal plate; exfoliating the metal plate from the original plate to make the metal plate into a master substrate; and forming a magnetic layer on the protruding and recessed pattern of the master substrate.

According to the manufacturing method of the seventeenth aspect, in the electroforming process, a metal plate composed of an electroforming layer with a three layer structure in which a first layer and a third layer have a same crystal orientation, and in which a second layer with a crystal orientation different from the crystal orientation of the first layer and the third layer is sandwiched between the first layer and the third layer, is arranged to be laminated on an original plate so that the protruding and recessed pattern of the original plate is transferred to the surface of the metal plate. As a result, a magnetic transfer master disk with small amounts of warpage and distortion can be manufactured.

In addition, since a magnetic transfer master disk with small amounts of warpage and distortion can be manufactured, the manufacturing yield is improved.

An eighteenth aspect of the present invention is characterized in that in the seventeenth aspect, the crystal orientation of the first layer to the third layer, and the layer thickness of each of the layers are both controlled in the electroforming process.

According to the eighteenth aspect, the deformation resistance of each of the layers is arranged to be controlled by both crystal orientation and layer thickness, so that electroforming conditions can be easily controlled, and hence, the occurrence of warpage and distortion can be more precisely suppressed.

A nineteenth aspect of the present invention is characterized in that in the eighteenth aspect, when the layer thickness of the first layer is set to a, and the layer thickness of the third layer is set to c, the layer thickness is controlled so as to satisfy the layer thickness relation that a/(a+c) is within a range of 0.70 to 0.85.

This is because a master disk with still smaller amounts of warpage and distortion can be obtained with this layer thickness relation.

In order to achieve the above described objects, according to a twentieth aspect of the present invention, there is provided a magnetic transfer method comprising: a close contact process for making a disk to be transferred closely contact with the protruding and recessed pattern surface of one of the magnetic transfer master disks according to the tenth to sixteenth aspects; and a magnetic field applying process for applying a transfer magnetic field to the magnetic transfer master disk and the disk to be transferred which are made to be in close contact with each other, and for transferring the protruding and recessed pattern of the magnetic transfer master disk to the disk to be transferred.

According to the twentieth aspect, the magnetic transfer processing is applied to the disk to be transferred by using the magnetic transfer master disk with small amounts of warpage and distortion. Thereby, the effect of warpage and distortion of the master disk can be eliminated and the magnetic transfer can be performed in a desirable close contact state, as a result of which the transfer accuracy is improved.

As described above, the magnetic transfer master disk and its manufacturing method according to, the present invention, makes it possible to obtain a master disk which has small amounts of warpage and distortion and which is excellent in flatness. Therefore, when the magnetic transfer processing is applied to a disk to be transferred by using the master disk according to the present invention, the master disk and a disk to be transferred can be kept to be in close contact with each other in a desirable state at the time of magnetic transfer, as a result of which the highly precise magnetic transfer can be performed.

Further, a master disk with large amounts of warpage and distortion becomes defective and causes to lower the manufacturing yield, but the use of the method for manufacturing the magnetic transfer master disk, according to the present invention, makes it possible to manufacture a master disk which has small amounts of warpage and distortion and which is excellent in flatness, as a result of which the manufacturing yield can be improved.

DETAILED DESCRIPTION OF THE PREFERRED EMBODIMENTS

In the following, preferred embodiments of the magnetic transfer master disk, its manufacturing method and the magnetic transfer method according to the present invention will be described in detail with reference to the accompanying drawings.

First Embodiment

According to a first embodiment of the present invention, there is provided a magnetic transfer master disk characterized by comprising: a master substrate formed by a metal plate, on the surface of which a protruding and recessed pattern corresponding to transfer information is transferred by electroforming, the metal plate being composed of two or more electroforming layers that are different from each other in crystal orientation; and a magnetic layer formed on the protruding and recessed pattern of the master substrate, and there are also provided a method for manufacturing the magnetic transfer master disk, and a magnetic transfer method.

Figure 1:
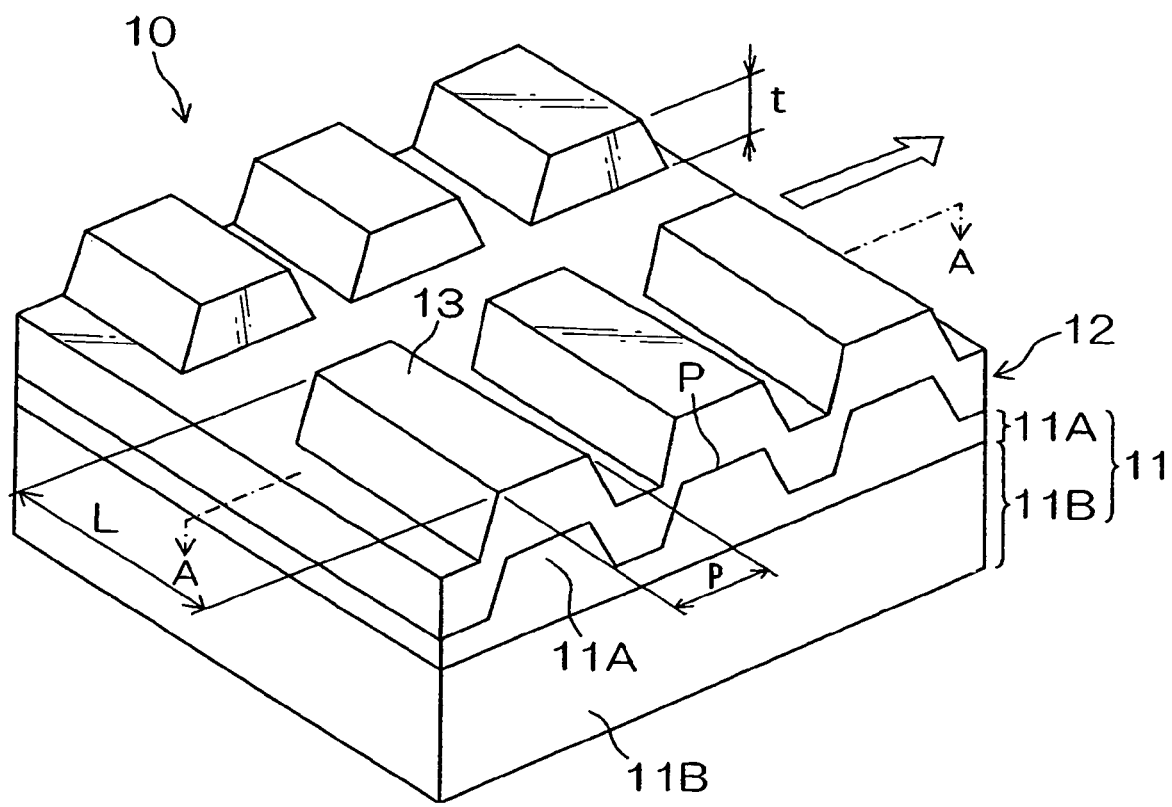
FIG. 1 is a perspective view of a part of a master disk of a first embodiment according to the present invention.
Figure 2:
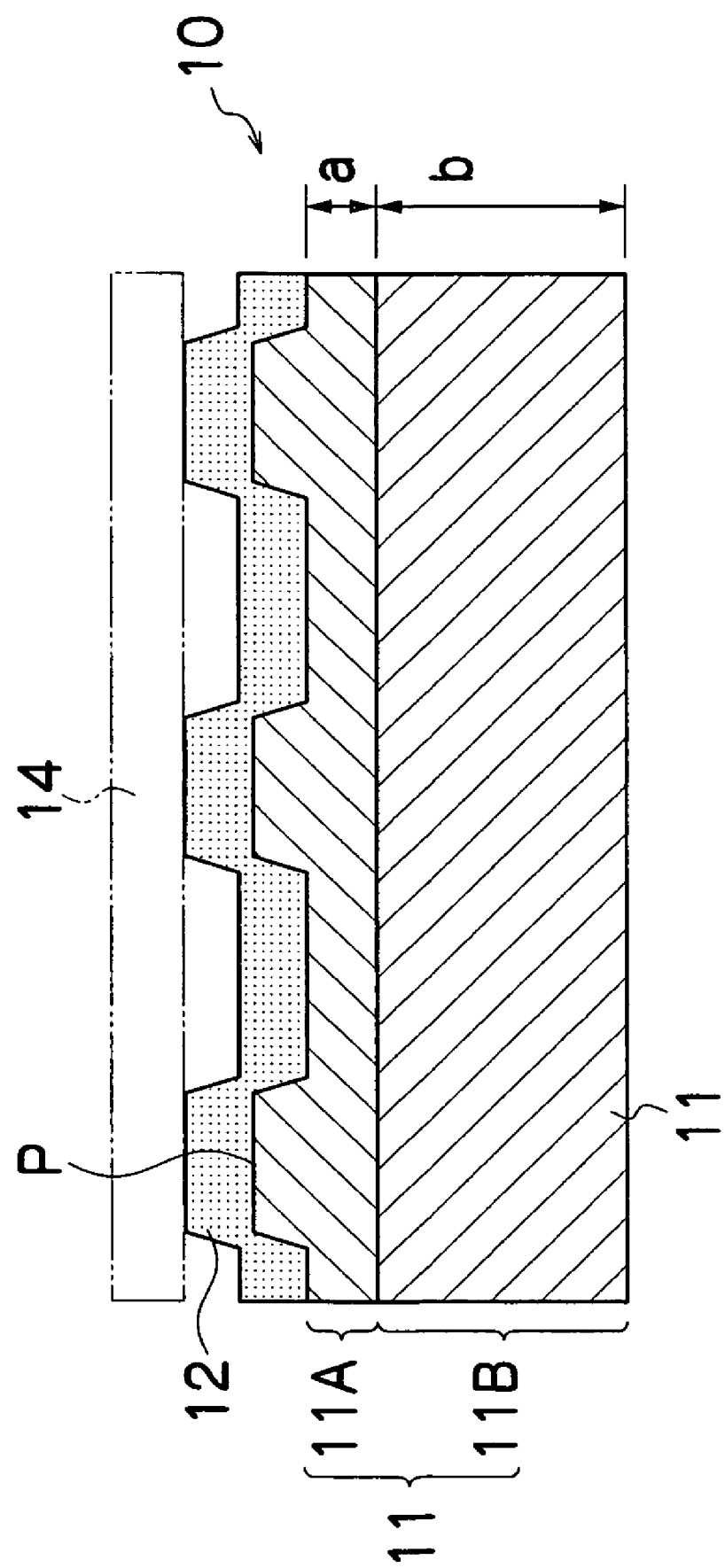
FIG. 2 is a sectional view taken along the line A-A line in FIG. 1.

FIG. 1 is a perspective view of a part of a magnetic transfer master disk 10 (hereinafter referred to as master disc 10) according to the present invention. FIG. 2 is a sectional view taken along the line A-A line in FIG. 1, and shows a disk to be transferred (slave disk 14) with an imaginary line.

As shown in FIG. 1 and FIG. 2, the master disc 10 comprises a metal master substrate 11 and a magnetic layer 12. A fine protruding and recessed pattern P (for example, servo information pattern) corresponding to transfer information, is provided on the surface of the master substrate 11, and the magnetic layer 12 is applied on the protruding and recessed pattern P. Thereby, an information carrying surface 13 having the fine protruding and recessed pattern P coated with the magnetic layer 12 is formed on one face of the master substrate 11. As can be seen from FIG. 1, the fine protruding and recessed pattern P has a rectangular form in a plane view, and has a length p in the track direction (the direction of arrow in FIG. 1) and a length L in the radial direction in the state where the magnetic layer 12 with a thickness t is formed. An optimum values of the length p and the length L are different depending upon the recording density and record signal waveforms, but for example, the length p may be taken as 80 nm and the length L as 200 nm. In the case where the fine protruding and recessed pattern P is a servo signal, the pattern is formed so as to be long in the radial direction. Preferably, in this case, the length L in the radial direction is 0.05 to 20 μm, and the length p in the track direction (circumferential direction) is 0.01 to 5 μm. The protruding and recessed pattern P having a longer radial length in this range is preferably selected for a pattern carrying a servo signal. The depth t (height of protrusion) of the protruding and recessed pattern P is preferably in the range of 30 to 800 nm, and more preferably in the range of 50 to 300 nm.

Figure 3:
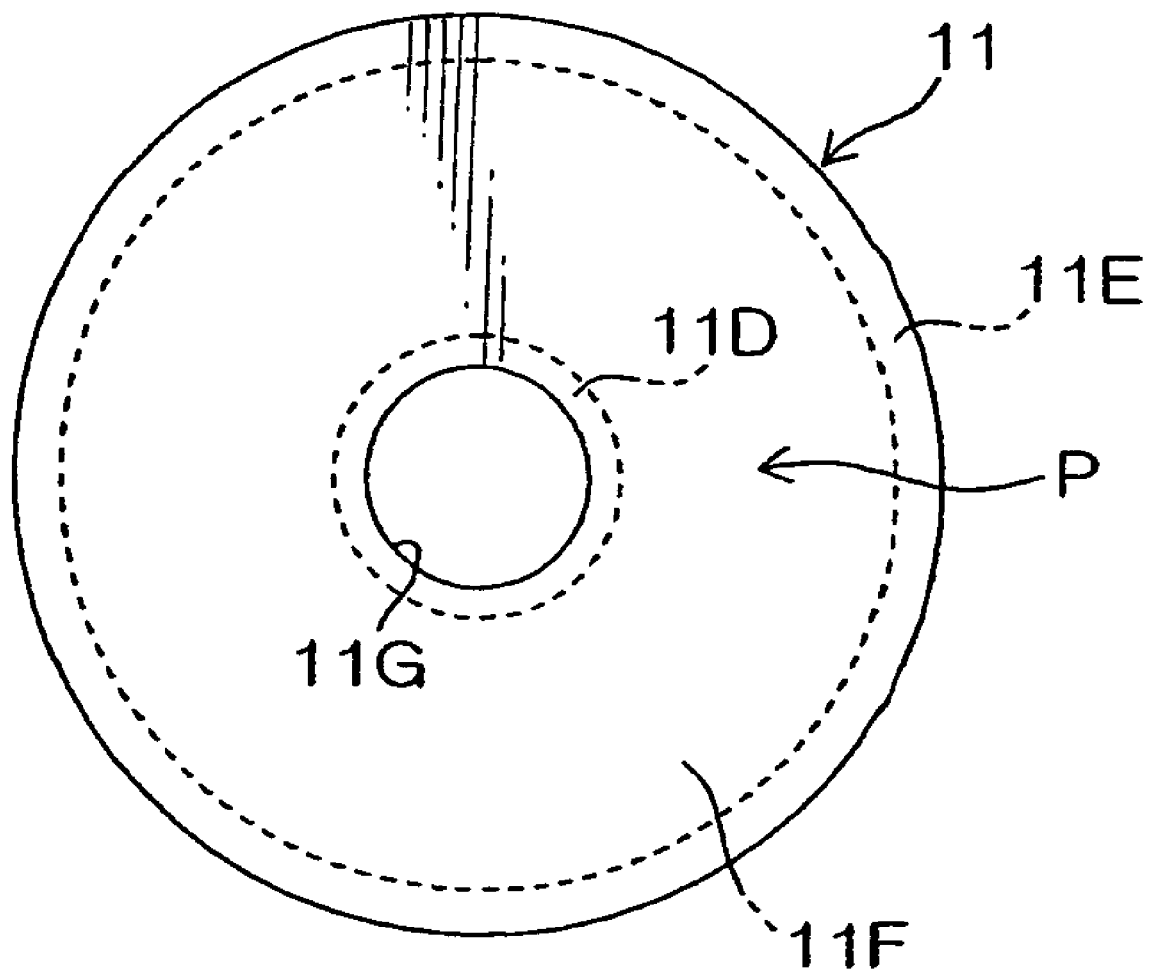
FIG. 3 is a top view of a master substrate.

The master substrate 11 which is produced by electroforming, is formed into a disk shape having a central hole 110 as shown in FIG. 3. The protruding and recessed pattern P is formed on a annular region 11F except for an inner periphery 11D and an outer periphery 11E of one face (information carrying surface 13) of the master substrate 11. The master substrate 11, whose manufacturing process will be described in detail below, is mainly manufactured by applying electroforming processing on an original plate with information formed thereon by a protruding and recessed pattern, to laminate on the original plate a metal plate composed of two or more electroforming layers that are different from each other in crystal orientation, and to transfer the protruding and recessed pattern P to the metal plate, and by exfoliating the metal plate from the original plate.

In the present invention, various metals and alloys can be used as the two or more electroforming layers that are different from each other in crystal orientation. However, an example of a Ni electroforming layer composed of two layers will be described below as a preferred example of the present embodiment.

As shown in FIG. 1 and FIG. 2, in the Ni electroforming layer, the crystal orientation of a first layer 11A formed on the side of the protruding and recessed pattern P is preferentially oriented on Ni (220), and the crystal orientation of a second layer 11B formed on the side opposite to the protruding and recessed pattern of the first layer 11A is preferentially oriented on Ni (200). In this case, when the layer thickness of the first layer 11A is set to a, and the layer thickness of the second layer 11B is set to b, a/b is preferably in a range of 0.1 to 0.25.

Next, a manufacturing process of the master disc 10 according to the present invention constituted as described above, will be described in detail.

FIG. 4 is a process chart showing processes for manufacturing the master disc 10.

Figure 4A:
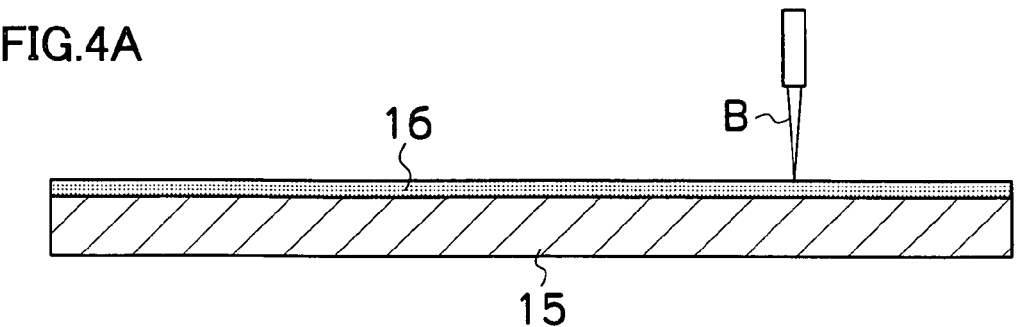
FIGS. 4A to 4E are process charts in an example of a manufacturing process of the master disc of the first embodiment according to the present invention.

First, as shown in FIG. 4A, pretreatment such as to form a close contact layer on an original plate 15 made of a silicone wafer whose surface is flat and clean (which original plate may be a glass plate or a quartz plate), so that a resist film 16 is formed by applying an electron beam resist solution on the original plate 15 by spin coating and the like, so as to be baked. Then, the original plate 15 is mounted on a stage of an electron beam exposing device (not shown) provided with a highly precise rotating stage and X-Y stage, and irradiated by an electron beam B modulated to correspond to a servo signal and the like, so that a desired protruding and recessed pattern P' is plotted and exposed on the resist film 16.

Figure 4B:
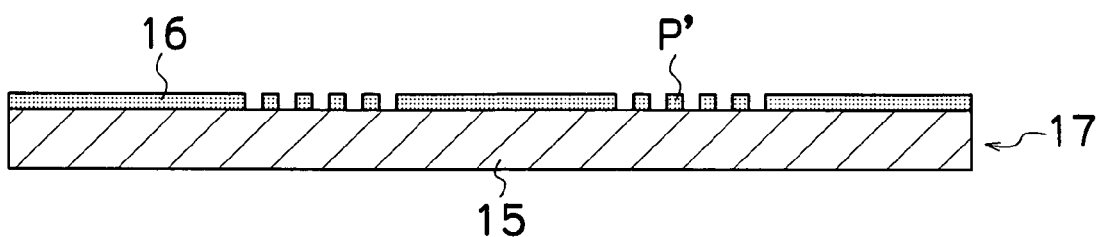

Next, as shown in FIG. 4B, the resist film 16 is developed, so that the desired protruding and recessed pattern P' is formed by the resist film 16 left after the exposed portion of the resist film is removed. Then, a Ni conductive film (not shown) is provided on the protruding and recessed pattern P' by, for example, sputtering, so that an electroformable original plate 17 is produced.

Figure 4C:
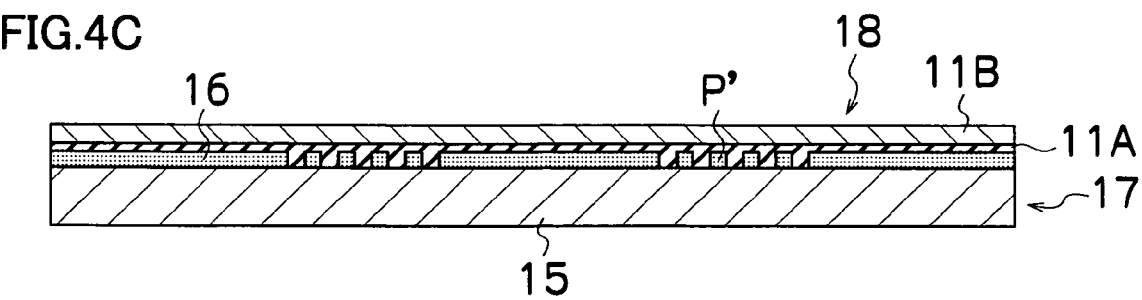
Figure 4D:
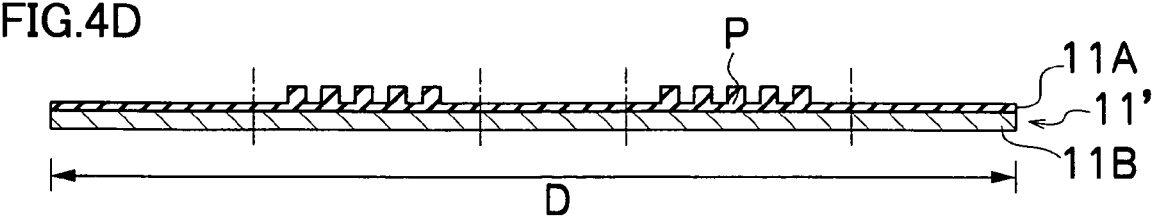
Figure 4E:
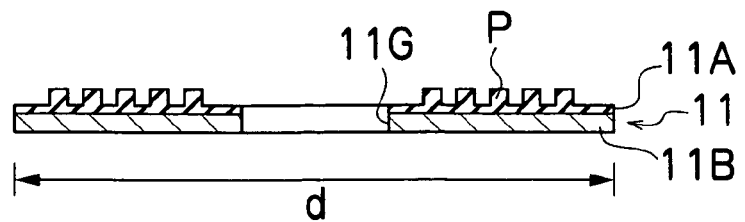

Next, as shown in FIG. 4C, an electroforming processing is applied for the whole surface of the original plate 17 by use of an electroforming device, so that a metal plate 18 (Ni electroforming layer) with a desired thickness made of Ni metal is laminated. Then, the metal plate 18 is exfoliated from the original plate 17, and the residual resist film 16 is removed and washed. Thereby, as shown in FIG. 4D, an original plate 11' of the master substrate 11 is obtained, which has a reversed protruding and recessed pattern P and an outer diameter D before being punched into a predetermined size. The master substrate 11 with a predetermined size of outer diameter d as shown in FIG. 4E is obtained by punching out the original plate 11'. The master disk 10 can be manufactured by forming the magnetic layer 12 on the surface of the protruding and recessed pattern of the master substrate 11.

Noted that a second original plate is produced by applying an electroforming processing to the original plate 17 in another manufacturing process of the master disk 10. Thus, a metal plate having the reversed protruding and recessed pattern may be produced by performing electroforming by using the second original plate, so that a master substrate is made by punching the metal plate into a predetermined size. Further, a third original plate may be produced by applying electroforming processing to the second original plate or by pressing a resin liquid to the second original plate and hardening the resin liquid. Then, a metal plate may be produced by applying electroforming processing to the third original plate, so that the metal plate having a further reversed protruding and recessed pattern is exfoliated from the third original plate so as to be made into a master substrate. A plurality of metal plates 18 can be produced by repeatedly using the second original plate or the third original plate. Further, in producing the original plate, after the resist film is subjected to the exposing and developing processing, the protruding and recessed pattern may be formed on the surface of the original plate by etching, and thereafter the resist film may be removed.

The magnetic layer 12 is formed by vacuum film forming devices, such as a vacuum deposition method, a sputtering method, an ion plating method, and by a plating method, a coating method or the like. As a magnetic material of the magnetic layer, Co, Co alloys (CoNi, CoNiZr, CoNbTaZr, and the like), Fe, Fe alloys (FeCo, FeCoNi, FeNiMo, FeAlSi, FeAl, FeTaN, and the like), Ni, Ni alloys (NiFe and the like) can be used. In particular, FeCo, FeCoNi can preferably be used. The thickness of the magnetic layer 12 is preferably in the range of 50 to 500 nm, and most preferably in the range of 100 to 400 nm.

Noted that a protective film of such as a diamond-like carbon (DLC) and a sputtered carbon is preferably provided on the magnetic layer 12, and further a lubricant layer may preferably be provided on the protective film. In this case, a configuration provided with the DLC film having a thickness of 3 to 30 nm as the protective film and with the lubricant layer is preferred. Further, a close contact reinforcing layer made of Si and the like may also be arranged to be provided between the magnetic layer and the protective film. The lubricant has the effect of improving deterioration of the durability, such as the generation of flaws by friction at the time when a deviation caused in contacting process with the slave disk 14 is corrected.

In the above described manufacturing process of the master disc 10, the warpage and distortion are liable to be generated in the master disc 10 due to deformation caused in the processes to produce the master substrate 11, which processes include the exfoliating process for exfoliating the metal plate 18 from the original plate 17 and the punching process for punching the original plate 11' of the master substrate 11 into a predetermined size.

As a measure for improving the warpage and distortion, in the present invention, when the metal plate 18 is laminated by the electroforming processing, electroforming is arranged to be performed to form a Ni electroforming layer composed of two layers that are different from each other in crystal orientation. That is, crystal orientation and layer thickness of the two layers constituting the Ni electroforming layer are controlled by changing current density of current supplied to a Ni electroforming bath as shown in FIG. 5, while the original plate 17 provided with a Ni conductive film is immersed in the Ni electroforming bath and rotated at a rotation speed of 50 to 150 rpm.

Figure 5:
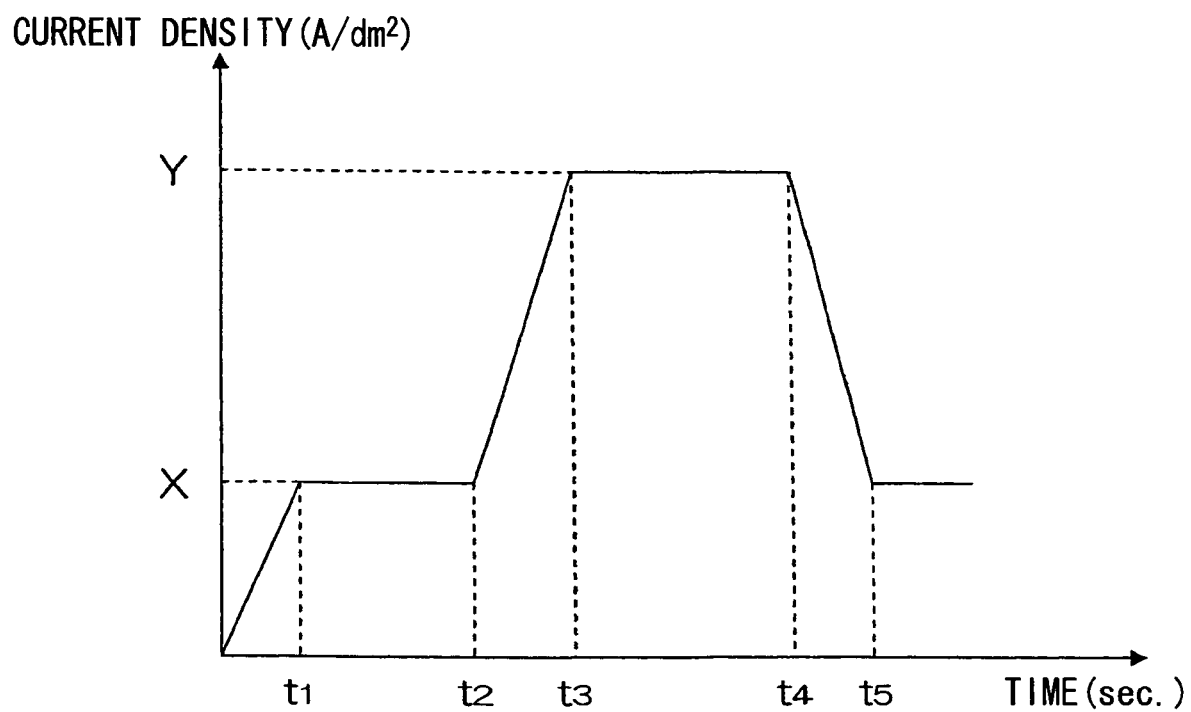
FIG. 5 is an illustration explaining variation of current density versus electroforming time in an electroforming process for producing a master substrate of the first embodiment according to the present invention.

FIG. 5 shows variation of current density (A/dm2) versus electroforming time. The first layer 11A constituting the surface side of the protruding and recessed pattern P (surface side in contact with the original plate 17) needs to be electroformed at a low current density, so that the crystal orientation of the first layer 11A can be preferentially oriented on Ni (220), and that a fine protruding and recessed pattern can be coated on the layer. For this reason, the current density is set to X (A/dm2) shown in FIG. 5, so that the crystal orientation is preferentially oriented on Ni (220) by an X-ray diffraction apparatus. The current density X is somewhat changed by the Ni electroforming bath and electroforming conditions, but is preferably set to within the range of 1 to 10 (A/dm2). When the current density reaches a set value X (t1), the current density is held for a predetermined period (t1 to t2) so that the first layer 11A with the preferred crystal orientation Ni (220) is formed so as to have a predetermined thickness (for example 50 μm).

Next, following the forming of the first layer 11A, the second layer 11B is formed so as to enable the crystal orientation to be preferentially oriented on Ni (200). Also in this case, the current density is set to Y (A/dm2) shown in FIG. 5, so that the crystal orientation is preferentially oriented on Ni (200) by the X-ray diffraction apparatus. The current density Y is somewhat changed by the Ni electroforming bath and electroforming conditions, but is preferably set to about 20 (A/dm2). When the current density Y reaches a set value Y (t3), the current density is held for a predetermined period (t3 to t4) so that the second layer 11B with the preferred crystal orientation Ni (200) is formed so as to have a predetermined thickness (for example 250 μm). The current density Y can be increased up to 30 (A/dm2) on condition that the crystal orientation is preferentially oriented on Ni (200). However, an excessively large current density causes a void to be formed in the layer, and hence, the current density of about 20 (A/dm2) are preferred.

Next, immediately before the sum of the layer thicknesses of the laminated two layers 11A, 11B reaches 300 μm, the current density is lowered to about 5 (A/dm2) (t5), and then the current density is held for about 10 minutes, so as to reduce the roughness of the rear face and to adjust the thickness of the second layer 11B.

In this way, according to the present embodiment, the layer structure of the Ni electroforming layer constituting the metal plate 18 is composed of the two layers 11A, 11B that are different from each other in crystal orientation, so that the layers 11A, 11B are different from each other not only in the sliding surface and the sliding direction, but also in the internal stress (residual stress) inherent to each of the layers. This enables the direction of the deformation resistance caused at the time when the exfoliating and punching operations are performed, to be different for each of the layers 11A, 11B. Therefore, when the electroforming layer constituting the metal plate 18 is arranged to be composed of the two layers 11A, 11B that are different from each other in crystal orientation, so as to make the direction of the deformation resistance different for each layer, it is possible to reduce the amount of deformation at the time of exfoliating and punching, as a result of which the occurrence of warpage and distortion can be significantly suppressed.

Factors causing fluctuation in electroforming conditions depend on the time-based change of components in the plating solution, the surface conductivity, and the current density within the surface. Thus, a time-based change is caused, even in the case where the electroforming is performed with a constant current density. Thus, the electroforming conditions need to be highly precisely controlled in order to control crystal orientation of each of the two layers 11A, 11B to the desired crystal orientation. For this reason, the control by both crystal orientation and layer thickness is preferred. In the case where the Ni electroforming layer is constituted by the first layer 11A preferentially oriented on Ni (220) and the second layer 11B preferentially oriented on Ni (200), when the layer thickness of the first layer 11A is set to a, and the layer thickness of the second layer 11B is set to b, a/b is preferably in the range of 0.1 to 0.25.

Further, the metal used for the master disk 10 is usually a nickel (Ni). However, in the case where the master disk 10 is manufactured by electroforming, a nickel sulfamate bath by which the master substrate 11 with small internal stress is easily obtained, is preferably used. The nickel sulfamate bath is based on for example nickel sulfamate of 400 to 800 g/L, boric acid of 20 to 50 g/L (supersaturation), and is added with an additive such as a surfactant (for example, sodium lauryl sulfate), as required. The plating bath temperature is preferably 40 to 60° C. A nickel ball contained in a titanium case is preferably used for the counter electrode at the time of electroforming.

Figure 6:
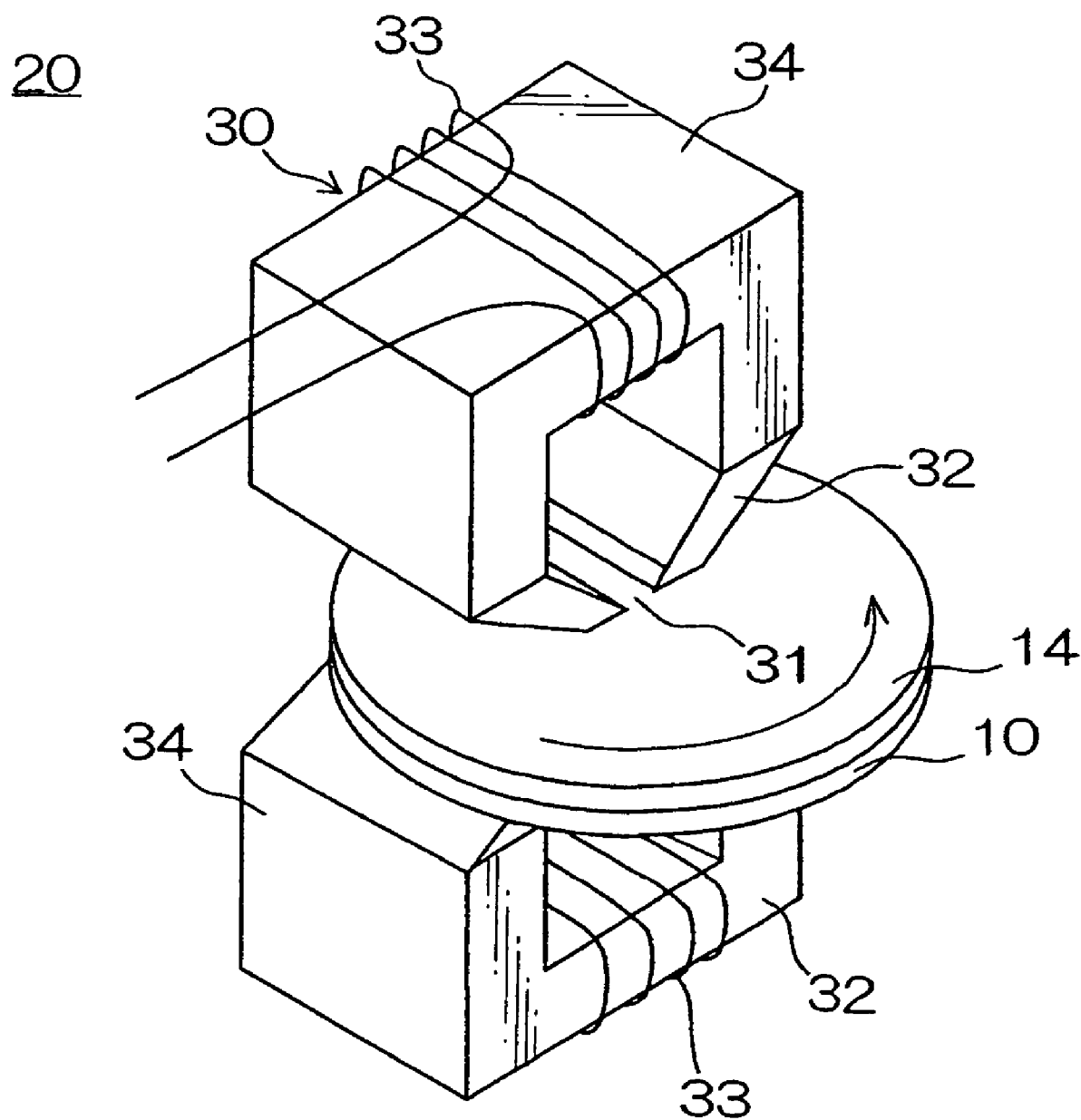
FIG. 6 is a perspective view of a major portion of a magnetic transfer device for performing a magnetic transfer method according to the present invention.

Next, the magnetic transfer method for transferring the protruding and recessed pattern P of the master disc 10 manufactured as described above to the slave disk 14, will be described. FIG. 6 is a perspective view of a major portion of a magnetic transfer device 20 for performing magnetic transfer using the master disc 10 according to the present invention.

Figure 8A:
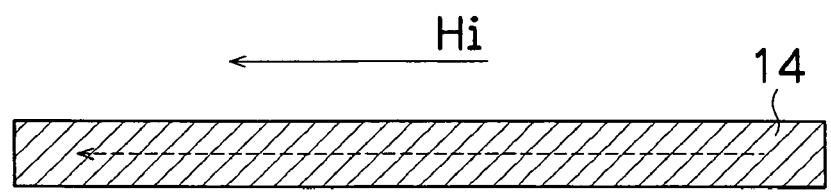
FIGS. 8A to 8C are process charts showing a basic process of the magnetic transfer method.

At the time of magnetic transfer, after the slave disk 14 is initially magnetized by a DC magnetic field, as will be described below and as shown in FIG. 8A, the slave surface (magnetic recording surface) of the slave disk 14 is made to be in contact with the information carrying surface 13 of the master disc 10, and to be further closely in contact with the information carrying surface with a predetermined pressure. Then, in the state where the slave disk 14 and the master disk 10 are closely in contact with each other, a transfer magnetic field is applied from magnetic field generating device 30 so that the protruding and recessed pattern P of the master disc 10 is transferred to the slave disk 14.

The slave disks 14 is a disc-like recording medium, such as a hard disk and a flexible disk, on one or both surfaces of which a magnetic recording layer is formed. Before the slave disk 14 is made to be in close contact with the master disk 10, cleaning processing (burnishing and the like) for removing minute projections and adherent dust existing on the surface by using a glide head and a polishing element and the like, is performed as required.

For the magnetic recording layer of the slave disk 14, a coating type magnetic recording layer, a plating type magnetic recording layer and a metal thin film type magnetic recording layer can be used. As a magnetic material of the metal thin film type magnetic recording layer, Co, Co alloys (CoPtCr, CoCr, CoPtCrTa, CoPtCrNbTa, CoCrB, CoNi, and the like), Fe, Fe alloys (FeCo, FePt, FeCoNi, and the like), and Ni, Ni alloys (NiFe and the like) can be used. These materials are preferred because it is possible to perform clear transfer because they have large magnetic flux density and magnetic anisotropy in the same direction (inplane direction in the case of intrasurface recording) as the magnetic field applying direction. Thus, in order to provide the magnetic anisotropy for a portion under (on the base side of) the magnetic material, a nonmagnetic underlayer is preferably provided. The underlayer needs to be adjusted to have the same crystal structure and lattice constants as those of the magnetic layer 12. To this end, Cr, CrTi, CoCr, CrTa, CrMo, NiAl, Ru, and the like are preferably used.

Figure 7:
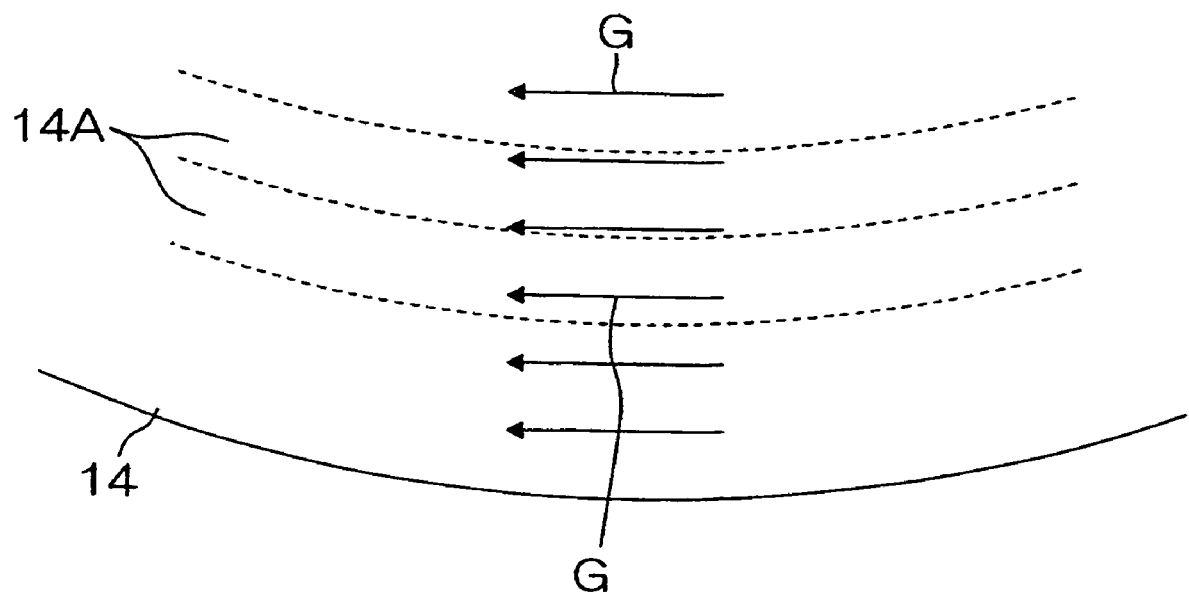
FIG. 7 is a top view showing a method for applying a transfer magnetic field.

In performing magnetic transfer using the master disk 10, there is a case where magnetic transfer is performed by making the master disk 10 in close contact with one face of the slave disk 14, and a case where a pair of master disks 10 are made to be in close contact with both faces of the slave disk 14, and magnetic transfer for both surface of the slave disk 14 is simultaneously performed. The magnetic field generating device 30 is provided with electromagnet devices 34, 34 in which a coil 33 is wounded around a core 32 having a gap 31 extending in the radial direction of the slave disk 14 and the master disk 10 which are kept in close contact with each other, the electromagnet devices being arranged on both upper and lower sides of the disks. The magnetic field generating device 30 applies transfer magnetic fields having magnetic lines of force G (see FIG. 7) which are in parallel with the track direction and in the same direction on both upper and lower sides of the disks which are kept in close contact with each other. FIG. 7 shows a relation between circumferential tracks 14A, 14A . . . , and magnetic lines of force G.

In the case of applying the magnetic field, the protruding and recessed pattern of the master disc 10 is magnetically transferred to the slave surface of the slave disk 14 by applying the transfer magnetic field by the magnetic field generating device 30, while the slave disk 14 and the master disc 10 are integrally rotated. Noted that in addition to the above described configuration, the magnetic field generating device 30 may also be arranged to be rotated.

The transfer magnetic field generates in a portion in the track direction a magnetic field having a magnetic field distribution, in which the magnetic field strength does not exceed a maximum value in the optimum transfer magnetic field strength range (0.6 to 1.3 times the coercive force Hc of the slave disk 14) in any portion in the track direction, in which the magnetic field strength is within the optimum transfer magnetic field strength range in at least one or more portions in one track direction, and in which the strength of magnetic field of the track direction opposite to the one track direction is less than a minimum value in the optimum transfer magnetic field strength range in any portion in the track direction opposite to the one track direction.

Figure 8B:
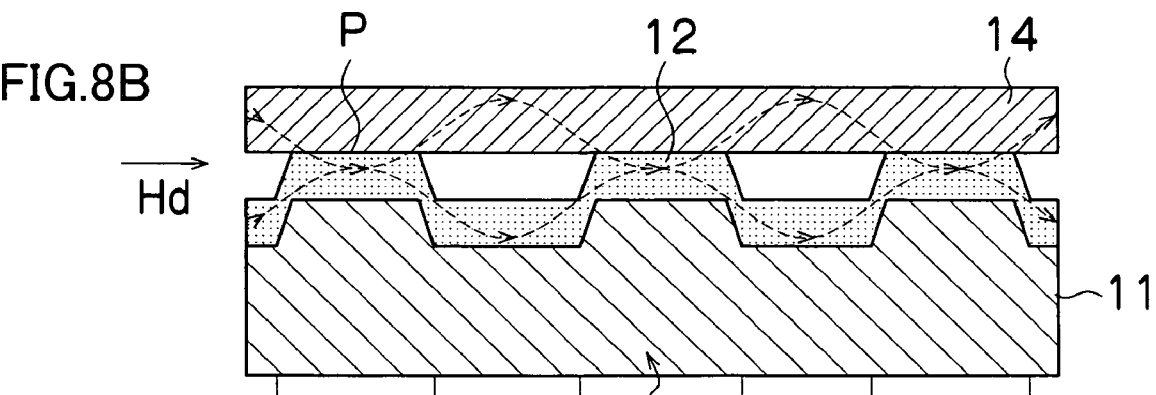
Figure 8C:
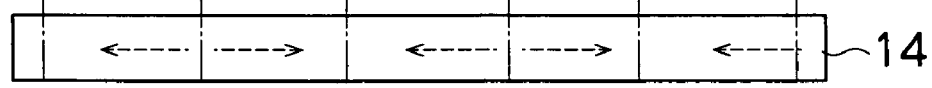

FIG. 8 is an explanatory view for explaining a basic process of the magnetic transfer method by intrasurface recording.

First, as shown in FIG. 8A, an initial magnetic field Hi is applied beforehand to the slave disk 14 in one track direction, so that initial magnetization (DC demagnetization) is performed. Next, as shown in FIG. 8B, the recording surface (magnetic recording section) of the slave disk 14 is made to be in close contact with the information carrying surface 13 of the master disc 10, on which surface the protruding and recessed pattern P is formed, and a transfer magnetic field Hd is then applied in the direction opposite to the direction of the initial magnetic field Hi, so that magnetic transfer is performed. The transfer magnetic field Hd is absorbed by the magnetic layer 12 of the protruding portion of the protruding and recessed pattern P, so that the magnetization of the portion of the slave disk 14 corresponding to the protruding portion is not reversed, and the magnetization of the other portion of the slave disk 14 is reversed, as a result of which the protruding and recessed pattern P of the master disk 10 is magnetically transferred to the magnetic recording surface of the slave disk 14 and recorded thereon.

In the above described magnetic transfer, it is important to bring the slave disk 14 and the master disk 10 desirably into close contact with each other in order to perform highly precise magnetic transfer. Thus, the use of the master disk 10 according to the present invention makes it possible to bring the slave disk 14 and the master disk 10 desirably into close contact with each other.

Noted that in the above described embodiment, the cause of warpage in the master substrate 11 is explained by examples of the exfoliating process and the punching process. However, the warpage may also be caused in the photoetching process as a process other than the exfoliating and punching processes. Therefore, the present invention is effective to provide a measure against the warpage caused in the photoetching process.

Example 1

Next, an example according to the first embodiment of the present invention will be described, but the present invention is not limited to the case.

Table 1 shows a relation of the layer thickness of the first layer 11A/the layer thickness of the second layer 11B (a/b) in the master disk 10 with a diameter of 2.5 inches (outer diameter: 65 mm, inner diameter: 24 mm) constituted by two Ni electroforming layers, in which the first layer 11A on the protruding and recessed pattern surface side is preferentially oriented on Ni(220), and the second layer 11B is preferentially oriented on Ni(200).

The crystal orientation and the layer thickness of the first layer 11A and the second layer 11B are measured by the electron backscattered diffraction (EBSD) method. That is, the crystal orientation in a cross section of the master substrate is evaluated by the EBSD, and the thickness of a layer whose occupation rate of the crystal orientation (220) is in the range of 10 to 85% in the cross section of the master substrate is set as the thickness of the first layer 11A, and the thickness of the other layer is set as the thickness of the second layer 11B. Noted that such calculation can also be performed by using a peak intensity ratio obtained by X-ray diffraction.

The measurement of the amount of warpage shown in Table 1 is performed as follows. First, the master disk 10 fixed to a spindle motor is rotated at 10 rpm. Then, a laser displacement gauge (LC-2430 made by KEYENCE Corp.) is installed so as to be perpendicular to the surface of the master disk 10, and the displacement quantity in the perpendicular direction in one round at a radial position is measured. Subsequently, the measurement is performed over whole surface (radial position=12.5 to 32.5 mm) by successively feeding the radial position by 1 mm at a time in the radial direction by the stepping motor. Then, an average value of measured data is calculated for each radius so that a relation between the radius and the average value is plotted. The difference between the maximum value and the minimum value at this time is defined as the amount of warpage. The amount of distortion is defined as a deviation from the average value at a radial position.

The symbols of "+" and "−" attached to the amount of warpage in Table 1 respectively represents directions of warpage opposite to each other.

TABLE 1

| | First layer (a) | Second layer (b) | a/b | Amount of warpage |
|---|---|---|---|---|
| Example 1 | 50 μm | 250 μm | 0.20 | −34 μm |
| Example 2 | 60 μm | 240 μm | 0.25 | −41 μm |
| Example 3 | 40 μm | 260 μm | 0.15 | +17 μm |
| Example 4 | 30 μm | 290 μm | 0.10 | +38 μm |
| Comparison example 1 | 20 μm | 280 μm | 0.07 | +56 μm |
| Comparison example 2 | 70 μm | 230 μm | 0.28 | −63 μm |

As can be seen from the measurement result shown in Table 1, as in the case of examples 1 to 4, when the layer thickness of the first layer 11A/the layer thickness of the second layer 11B (a/b) is within the range of 0.10 to 0.25, the amount of warpage +50 μm or less (−50 μm or more), which is acceptable. Specifically, in the case of example 3 in which the layer thickness of the first layer 11A is 40 μm and the layer thickness of the second layer 11B is 260 μm, the amount of warpage can be significantly reduced to 17 μm.

On the other hand, in comparison example 1 in which the layer thickness of the first layer 11A/the layer thickness of the second layer 11B (a/b) is 0.07, a value less than 0.1, and the amount of warpage is +56 μm, which is deviated from the acceptance range. Further, in comparison example 2 in which the layer thickness of the first layer 11A/the layer thickness of the second layer 11B (a/b) is 0.28, a value exceeding 0.25, and the amount of warpage is −63 μm, which is deviated from the acceptance range.

In this way, even when the crystal orientation of the two layers 11A, 11B is attempted to be controlled to a desired crystal orientation, the amounts of warpage fluctuates in accordance with the ratio of thickness of the two layers 11A, 11B. This is because the crystal orientation depends upon the time-based change of components in the plating solution, the surface conductivity, and the current density within the surface, so that even when electroforming is performed with a fixed current density, the time-based change is caused and thereby the crystal orientation fluctuates. Therefore, it is preferred to perform control by both crystal orientation and layer thickness, in order to perform precise control of the amount of warpage.

Second Embodiment

According to a second embodiment of the present invention, there is provided a method for manufacturing a magnetic transfer master disk, comprising: a master substrate with a three layer structure of electroforming layers constituting a metal plate, on the surface of which a protruding and recessed pattern corresponding to transfer information is transferred by electroforming, in which three layer structure a first layer and a third layer have a same crystal orientation, and a second layer with a crystal orientation different from the crystal orientation of the first layer and the third layer, is sandwiched between the first layer and the third layer; and a magnetic layer formed on the protruding and recessed pattern of the master substrate, and is also provided a method for manufacturing the magnetic transfer master disk, and a magnetic transfer method.

Figure 9:
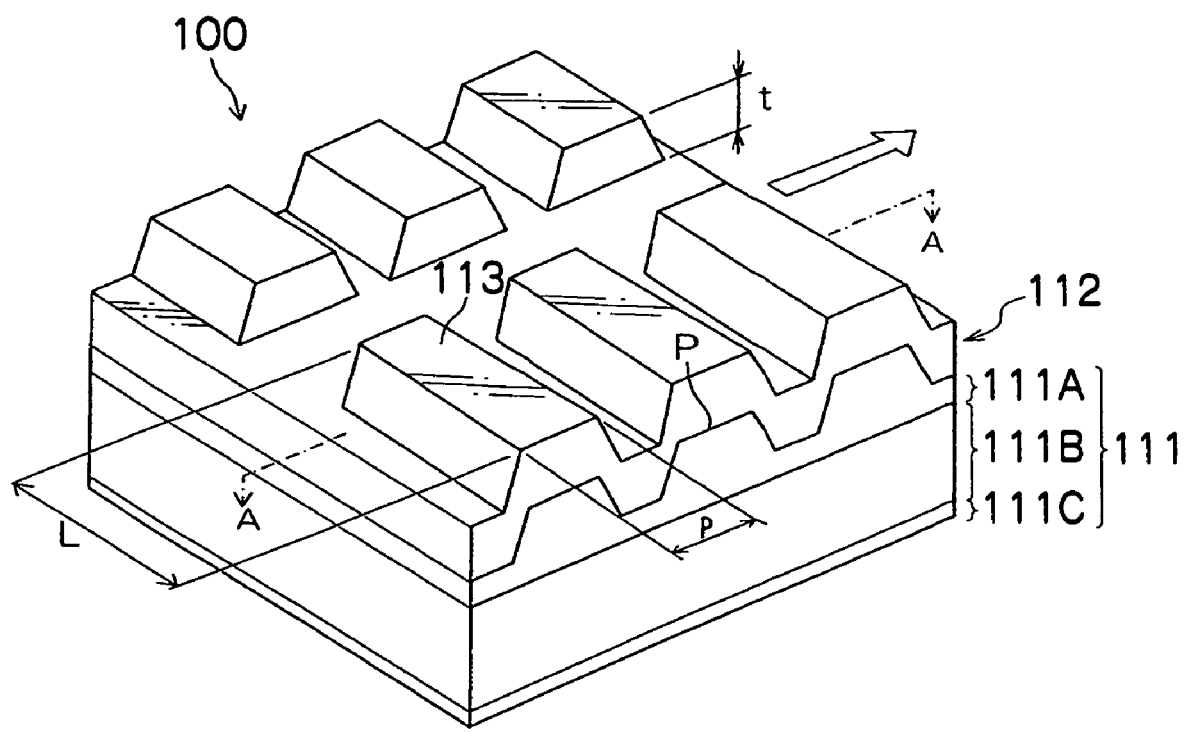
FIG. 9 is a perspective view of a part of a master disc of a second embodiment according to the present invention.
Figure 10:
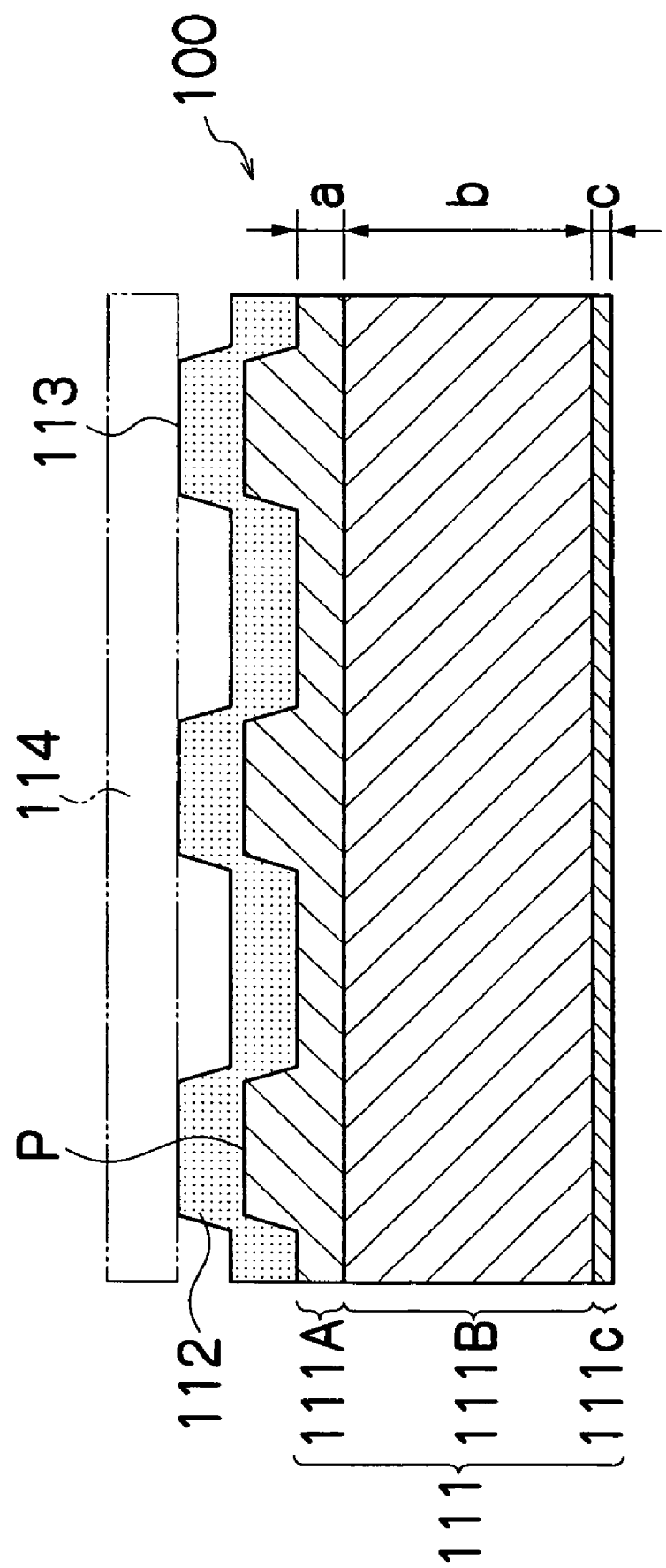
FIG. 10 is a sectional view taken along the line A-A line in FIG. 9.

FIG. 9 is a perspective view of a part of a magnetic transfer master disc 100 (hereinafter referred to as master disk 100) of according to the present invention, and FIG. 10 is a sectional view taken along the line A-A line in FIG. 9, in which a disk to be transferred (slave disk 14) is shown by an imaginary line.

As shown in FIG. 9 and FIG. 10, a master disc 100 comprises a metal master substrate 111 and a magnetic layer 112. On the surface of the master substrate 111, there is provided a fine protruding and recessed pattern P (for example, servo information pattern) corresponding to transfer information, and the magnetic layer 112 is applied on the protruding and recessed pattern P. Thereby, an information carrying surface 113 having a fine protruding and recessed pattern P covered with the magnetic layer 112 is formed on one face of the master substrate 111. As can be seen from FIG. 9, the fine protruding and recessed pattern P has a rectangular form in a plane view, and has a length p in the track direction (the direction of arrow in FIG. 9) and a length L in the radial direction, in the state where the magnetic layer with a thickness t is formed. An optimum values of the length p and the length L are different depending upon recording density and record signal waveforms, but for example, the length p can be taken as 80 nm and the length L as 200 nm. In the case where the fine protruding and recessed pattern P is a servo signal, the pattern is formed so as to be long in the radial direction. Preferably, in this case, the length L in the radial direction is 0.05 to 20 µm, and the length p in the track direction (circumferential direction) is 0.01 to 51 µm. The protruding and recessed pattern P with a longer radial length in this range is preferably selected for a pattern carrying the servo signal. The depth t (height of protrusion) of the protruding and recessed pattern P is preferably in the range of 30 to 800 nm, and more preferably in the range of 50 to 300 nm.

The master substrate 111 is produced by electroforming and thereby formed into a disk shape having the central hole 11G as shown in FIG. 3. The protruding and recessed pattern P is formed on the annular region 11F except for the inner periphery 11D and the outer periphery 11E of one face (information carrying surface 13) of the master substrate. The master substrate 111 is constituted as a metal plate (electroforming layer) with a three layer structure, to the surface of which the protruding and recessed pattern corresponding to transfer information is transferred by electroforming, as shown in FIG. 9 and FIG. 10. The three layer structure is formed so that the first layer and the third layer respectively constituting the front face side (protruding and recessed pattern side) and the rear face side of the electroforming layer, have a same crystal orientation, and that the second layer (intermediate layer) having a crystal orientation different from that of the first layer and the third layer, is sandwiched between the two layers.

In the present invention, various metals and alloys can be used for the electroforming layers with the three layer structure. However, an example of Ni electroforming layer constituted by the three layer structure will be described below as an example of a preferred embodiment according to the present invention.

As shown in FIG. 9 and FIG. 10, in the Ni electroforming layer, the crystal orientation of a first layer 111A and a third layer 111C is preferentially oriented on Ni (220), and the crystal orientation of a second layer 111B sandwiched between the first layer 111A and the third layer 111C is preferentially oriented on Ni (200). In this case, when the layer thickness of the first layer 111A is set to a, and the layer thickness of the third layer 111C is set to c, a/(a+c) is preferably within the range of 0.70 to 0.85. The layer thickness of the third layer is preferably 10 µm or more, with the relation of a/(a+c) satisfied.

Next, the manufacturing process of the master disc 100 according to the present invention, constituted as described above, will be described in detail.

FIG. 11 is a process chart showing a process for manufacturing the master disc 100.

Figure 11A:
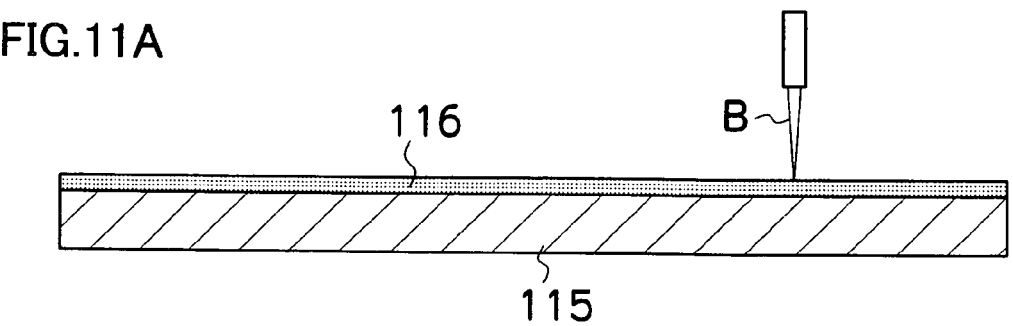
FIGS. 11A to 11E are process charts in an example of a manufacturing process of the master disc of the second embodiment according to the present invention.

First, as shown in FIG. 11A, pretreatment such as to form a close contact layer on an original plate 115 made of a silicone wafer whose surface is flat and clean (which original plate may be a glass plate or a quartz plate) is performed, and then a resist film 116 is formed by applying an electron beam resist solution on the original plate 115 by spin coating and the like, so as to be baked. Then, the original plate 115 is mounted on a stage of an electron beam exposing device (not shown) provided with a highly precise rotating stage and X-Y stage, and is irradiated by an electron beam B modulated to correspond to a servo signal and the like, so that a desired protruding and recessed pattern P' is plotted and exposed on the resist film 116.

Figure 11B:
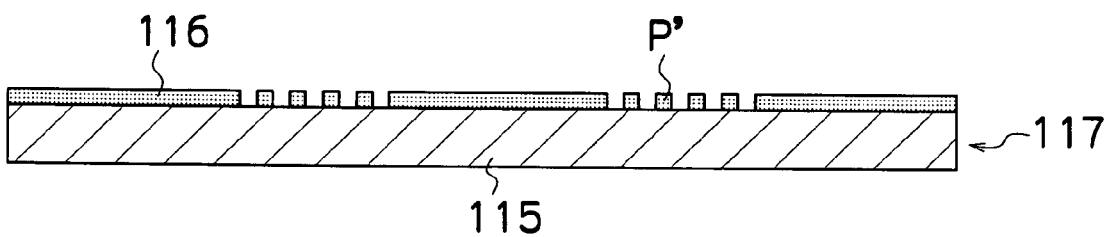

Next, as shown in FIG. 11B, the resist film 116 is developed, so that the desired protruding and recessed pattern P' is formed by the resist film 116 left after the exposed portion of the resist film is removed. Then, an electroformable original plate 117 is produced by providing a Ni conductive film (not shown) on the protruding and recessed pattern P' by, for example, sputtering.

Figure 11C:
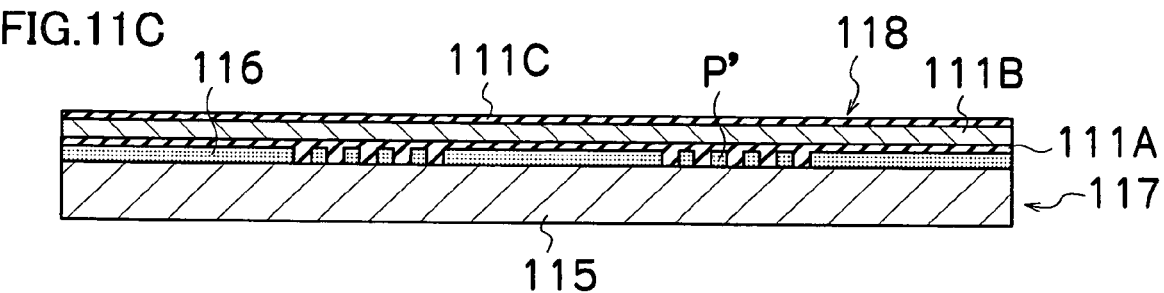
Figure 11D:
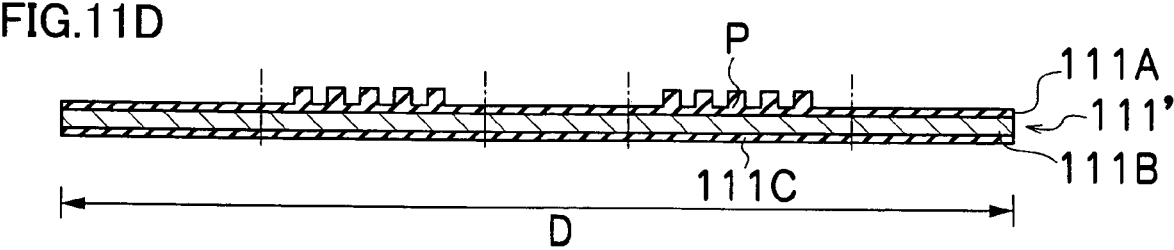
Figure 11E:
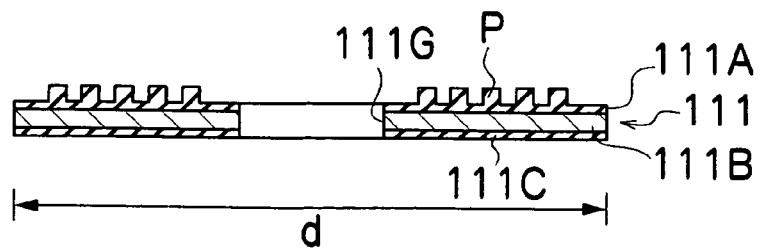

Next, as shown in FIG. 11C, an electroforming processing is applied for the whole surface of the original plate 117 by an electroforming device, so that a metal plate 118 (Ni electroforming layer) with a desired thickness made of Ni metal is laminated. Then, the metal plate 118 is exfoliated from the original plate 117, and the residual resist film 116 is removed and washed. Thereby, as shown in FIG. 11D, an original plate 111' of the master substrate 111 is obtained, which has a reversed protruding and recessed pattern P and an outer diameter D, before being punched into a predetermined size. The master substrate 111 with a predetermined size of outer diameter d as shown in FIG. 11E is obtained by punching out the original plate 111'. The master disk 100 can be manufactured by forming a magnetic layer 112 on the protruding and recessed pattern surface of the master substrate 111.

Noted that a second original plate is produced by applying an electroforming processing to the original plate 117 in another manufacturing process of the master disk 100. Thus, a metal plate having the reversed protruding and recessed pattern may be produced by performing electroforming by using the second original plate, so that a master substrate is made by punching out the metal plate into a predetermined size. Further, a third original plate may be produced by applying electroforming processing to the second original plate or by pressing a resin liquid to the second original plate and hardening the resin liquid. Then, a metal plate may be produced by applying electroforming processing to the third original plate, so that the metal plate having a further reversed protruding and recessed pattern is exfoliated from the third original plate so as to be made into a master substrate. A plurality of metal plates 118 can be produced by repeatedly using the second original plate and the third original plate. Further, in producing the original plate, after the resist film is subjected to the exposing and developing processing, the protruding and recessed pattern may be formed on the surface of the original plate by etching, and thereafter the resist film may be removed.

The magnetic layer 112 is formed similarly to the case of the above described first embodiment.

Noted that a protective film such as a diamond-like carbon (DLC) and a sputtered carbon is preferably provided on the magnetic layer 112, and further a lubricant layer may preferably be provided on the protective film. In this case, a configuration provided with a DLC film with a thickness of 3 to 30 nm as the protective film and with the lubricant layer is preferred. Further, a close contact reinforcing layer made of Si and the like may also be arranged to be provided between the magnetic layer and the protective film. The lubricant has the effect of improving deterioration of the durability, such as the generation of flaws by friction at the time when a deviation caused in contacting process with the slave disk 14 is corrected.

In the above described manufacturing process of the master disc 100, the warpage and distortion are liable to be generated in the master disc 100 due to deformation caused in the processes to produce the master substrate 111, which processes include the exfoliating process for exfoliating the metal plate 118 from the original plate 117 and the punching process for punching the original plate 111' of the master substrate 111 into a predetermined size.

As a measure for improving the warpage and distortion, in the embodiment according to the present invention, when the metal plate 118 is laminated by the electroforming processing, electroforming is arranged to be performed to form a Ni electroforming layer with a three layer structure in which the first layer and the third layer are provided with a same crystal orientation, and in which the second layer with a crystal orientation different from that of the first layer and the third layer, is sandwiched between the first and third layers. That is, the crystal orientation of the three layers constituting the Ni electroforming layer and the layer thickness of the three layers are controlled by changing the current density of current supplied to a Ni electroforming bath as shown in FIG. 12, while the original plate 117 provided with a Ni conductive film is immersed in the Ni electroforming bath and rotated at a rotation speed of 50 to 150 rpm.

Figure 12:
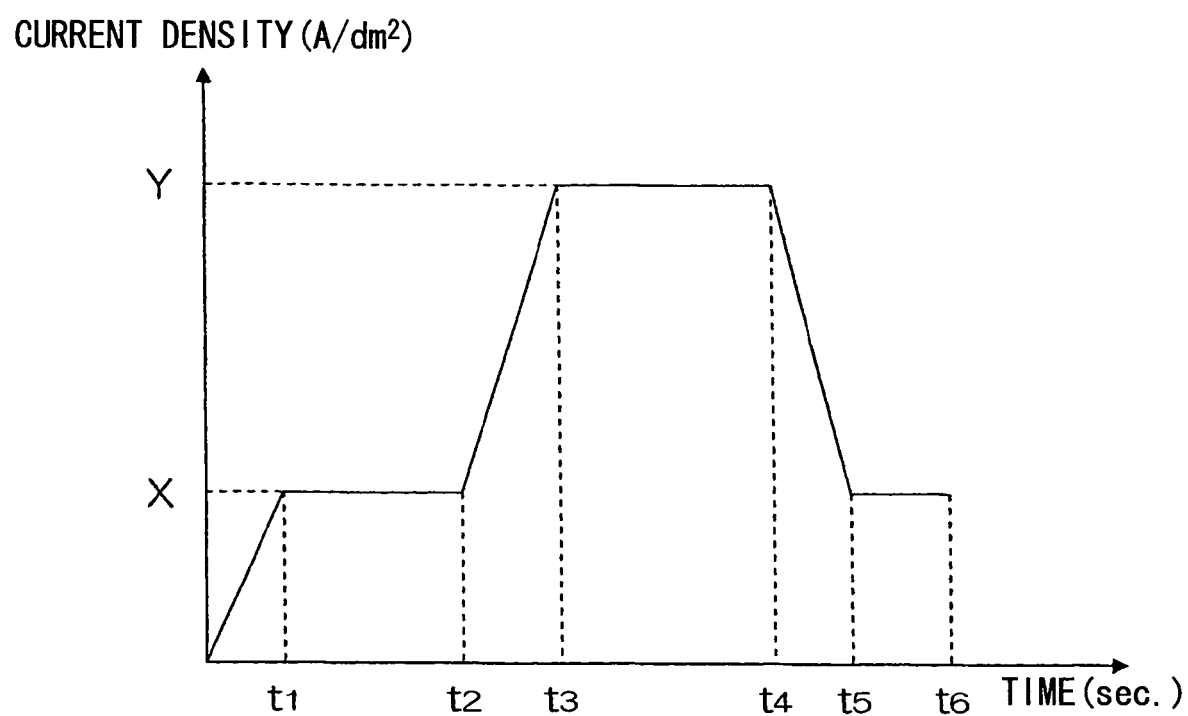
FIG. 12 is an illustration explaining variation of current density versus electroforming time in an electroforming process for producing a master substrate of the second embodiment according to the present invention.

FIG. 12 shows variation of current density (A/dm2) versus electroforming time. The first layer 111A constituting the front face side (surface side in contact with the original plate 117, to which surface the protruding and recessed pattern P is transferred) needs to be electroformed at a low current density, so that the crystal orientation of the first layer 111A can be preferentially oriented on Ni (220), and that a fine protruding and recessed pattern can be coated on the layer so as to follow the pattern form of the original plate. For this reason, the current density is set to X (A/dm2) shown in FIG. 12, so that the crystal orientation is preferentially oriented on Ni (220) by an X-ray diffraction apparatus. The current density X changes somewhat in accordance with the Ni electroforming bath and electroforming conditions, but is preferably set to within the range of 1 to 10 (A/dm2). When the current density reaches a set value X (t1), the current density is held for a predetermined period (t1 to t2), so that the first layer 111A with the preferred crystal orientation Ni (220) is formed to have a predetermined thickness (for example 50 μm). Thereby, the first layer 111A shown in FIG. 11 is formed.

Next, subsequently to the forming of the first layer 111A, the second layer 111B is formed so as to make the crystal orientation preferentially oriented on Ni (200). Also in this case, the current density is set to Y (A/dm2) shown in FIG. 12, so that the crystal orientation is preferentially oriented on Ni (200) by the X-ray diffraction apparatus. The current density Y changes somewhat in accordance with the Ni electroforming bath and electroforming conditions, but is preferably set to about 20 (A/dm2). When the current density Y reaches a set value Y (t3), the current density is held for a predetermined period (t3 to t4), so that the second layer 111B with the preferred crystal orientation Ni (200) is formed to have a predetermined thickness (for example 230 μm). The current density Y can be increased up to 30 (A/dm2) on condition that the crystal orientation is permitted to be preferentially oriented on Ni (200). However, an excessively large current density causes a void to be formed in the layer, and hence, the current density of about 20 (A/dm2) are preferred. Thereby, the second layer 111B shown in FIG. 11 is formed.

Next, subsequently to the forming of the second layer 111B, the third layer 111C is formed so as to make the crystal orientation preferentially oriented on Ni (220). That is, the current density Y by which the second layer 111B is formed, is reduced to the current density X set for the first layer 111A. When the current density reaches the set value X (t5), the current density is held for a predetermined period (t5 to t6) so that the third layer 111C with the preferred crystal orientation Ni (220) is formed to have a predetermined thickness (for example 10 μm). Thereby, the third layer 111C shown in FIG. 11 is formed.

In this way, according to the present embodiment, the layer structure of the Ni electroforming layer constituting the metal plate 118 is formed by the three layer structure in which the first layer and the third layer are provided with a same crystal orientation, and in which the second layer with a crystal orientation different from that of the first and third layers, is sandwiched between the first and third layers. Thereby, the first layer 111A and the third layer 111C are different from the second layer 111B not only in the sliding surface and the sliding direction, but also in the internal stress (residual stress) inherent to each of the layers 111A, 111B, 111C. This makes the direction of the deformation resistance caused when the exfoliating and punching operations are performed, different for each of the layers 111A, 111B, 111C. Therefore, when the layer structure of the electroforming layer constituting the metal plate 118, is formed to be the three layer structure, the direction of the deformation resistance of the three layers is different for each other, so that the amount of deformation caused at the time when the exfoliating and punching operations are performed, can be reduced to be small. Further, in the case of the three layer structure according to the present invention, the two layers (the first layer 111A and the third layer 111C) constituting the front and rear faces of the electroforming layer is the same in crystal orientation and in physical property, so that the balance of physical properties of the electroforming layer as a whole is improved. As a result, the resistance of the electroforming layer as a whole against warpage and deformation can be controlled by controlling the layer thickness relation between the first layer 111A and the third layer 111C. In this case, when the layer thickness of the first layer 111A is set to a, and the layer thickness of the third layer 111C is set to c, electroforming is performed so that the layer thickness relation that a/(a+c) is within the range of 0.70 to 0.85, is satisfied. Further, electroforming is performed so that the layer thickness of the third layer is 10 μm or more, with the relation of a/(a+c) satisfied.

This makes the metal plate 118 hardly deformed at the time of exfoliating and punching operations in the case where the master substrate 111 is produced. As a result, the occurrence of warpage and distortion in the produced master disk 100 can be significantly suppressed.

Further, the metal used for the master disk 100 is usually a nickel (Ni). However, in the case where the master disk 100 is manufactured by electroforming, a nickel sulfamate bath by which the master substrate 111 with small internal stress can be easily obtained, is preferably used. The nickel sulfamate bath is based on for example nickel sulfamate of 400 to 800 g/L, boric acid of 20 to 50 g/L (supersaturation), and is added with an additive such as a surfactant (for example, sodium lauryl sulfate), as required. The plating bath temperature is preferably 40 to 60° C. A nickel ball contained in a titanium case is preferably used for the counter electrode at the time of electroforming.

The magnetic transfer method and device for transferring the protruding and recessed pattern P of the master disc 100 manufactured as described above to the slave disk 14, are the same as those described in relation to the first embodiment, and hence, their description is omitted here.

Example 2

Next, an example according to the second embodiment of the present invention will be described, but the present invention is limited to the case.

Table 2 shows the relation between the layer thickness relation of the first layer 111A and the third layer 111C (a/a+c), and the amount of warpage, in a master disk 100 with a size of 2.5 inches (outer diameter: 65 mm, inner diameter: 24 mm) constituted by three Ni electroforming layers, in which the first layer 111A and the third layer 111C respectively corresponding to the front face side and the rear face side are preferentially oriented on Ni(220), and the second layer 111B sandwiched between the first layer 111A and the third layer 111C is preferentially oriented on Ni(200).

The crystal orientation and the layer thickness of the first layer 111A, the second layer 111B and the third layer 111C are measured by the electron backscattered diffraction (EBSD) method. That is, the crystal orientation in a cross section of the master substrate section is evaluated by the EBSD, and the thickness of a layer whose occupation rate of the crystal orientation (220) is in the range of 10 to 85% in the cross-section of the master substrate is set as the thickness of the second layer 111B. Then, the thickness of the layer on the front face side with respect to the second layer 111B is set as the thickness of the first layer 111A, and the thickness of the layer on the rear face side with respect to the second layer 111B is set as the thickness of the third layer 111C.

The measurement of the amount of warpage shown in Table 2 is performed as follows. First, the master disk 100 fixed to a spindle motor is rotated at 10 rpm. Then, a laser displacement gauge (LC-2430 made by KEYENCE Corp.) is installed so as to be perpendicular to the surface of the master disk 100, and the displacement quantity in the perpendicular direction in one round at a radial position is measured. Subsequently, the measurement is performed over whole surface (radial position=12.5 to 32.5 mm) by successively feeding the radial position by 1 mm at a time in the radial direction by the stepping motor. Then, an average value of measured data is calculated for each radius so that a relation between the radius and the average value is plotted. The difference between the maximum value and the minimum value at this time is defined as the amount of warpage. The amount of distortion is defined as a deviation from the average value at a radial position.

Even when there is no warpage for one circle, that is for one track, there is a deformation in which the heights of the inner peripheral part and the outer peripheral part of the master disc 100 is different from each other. That is, there exists a spherical deformation. Therefore, in the above described measurement of the amount of warpage, when an average of displacement values measured by the laser displacement gauge is taken for each of the concentric tracks, the amount of warpage is calculated as a difference between displacement values of a track with a maximum deformation value and a track with a minimum deformation value. The symbols of "+" and "−" attached to the amount of warpage in Table 2 respectively represents directions of warpage opposite to each other. The symbol "±" attached to the amount of warpage in Table 2, shows the variation obtained when repeat tests are performed five times for each of the examples of the embodiment and the comparison example. For example, an expression "−10±16" which is the amount of warpage of example 2, represents that the average value of the warpage is −10 μm and the variation is ±16 μm when the measurement is repeated five times. Thus, in the case of examples 2, the amount of warpage is in the range of "−26 to +6", and the maximum value of the amount of warpage is −26.

TABLE 2

|  | First layer (a) | Second layer (b) | Third layer (c) | a/(a + c) | Amount of warpage |
| --- | --- | --- | --- | --- | --- |
| Example 1 | 50 μm | 240 μm | 10 μm | 0.83 | −10 ± 16 μm |
| Example 2 | 50 μm | 230 μm | 21 μm | 0.70 | +13 ± 8 μm |
| Example 3 | 60 μm | 230 μm | 10 μm | 0.85 | −23 ± 12 μm |
| Example 4 | 60 μm | 220 μm | 20 μm | 0.78 | −12 ± 9 μm |
| Example 5 | 50 μm | 250 μm | 10 μm | 0.80 | +16 ± 18 μm |
| Comparison example 1 | 50 μm | 250 μm | 0 μm | 1.00 | 41 ± 38 μm |
| Comparison example 2 | 50 μm | 245 μm | 5 μm | 0.91 | 32 ± 23 μm |
| Comparison example 3 | 50 μm | 220 μm | 30 μm | 0.63 | +36 ± 15 μm |

As can be seen from the result shown in Table 2, as in the cases of examples 1 to 5, when the layer thickness relation between the first layer 111A and the third layer 111C: (a/a+c) is within the range of 0.70 to 0.85, the amount of warpage is +50 μm or less (−50 μm or more). Thus, these cases are acceptable. Specifically, as in the cases of example 2, example 4, example 5, the amount of warpage can be significantly reduced in the layer thickness relation that (a/a+c) is within the range of 0.70 to 0.80. As can be seen from comparison between example 4 and example 5, the total thickness of the electroforming layer is 300 μm which is the same for both examples, and the layer thickness of the second layer is 250 μm which is also the same for both examples. However, a more excellent result is obtained in example 4 in which the layer thickness of the third layer is 20 μm than in example 5 in which the layer thickness of the third layer is 10 μm. This represents that the layer thickness of the third layer is preferably made as thick as possible, while the value of (a/a+c) is kept within the range of 0.70 to 0.85.

On the other hand, in comparison example 3 in which (a/a+c) is 0.63, a value less than 0.70, the amount of warpage is +51 μm, which is deviated from the acceptance range. Further, in comparison example 2 in which (a/a+c) is 0.91, a value exceeding 0.85, the amount of warpage is −55 μm, which is deviated from the acceptance range. Further, in comparison example 1 with two layer structure in which the two layers are different from each other in crystal orientation, a maximum amount of warpage is as large as −79 μm.

What is claimed is:

1. A magnetic transfer master disk comprising:
   a master substrate formed by a metal plate, on a surface of which a protruding and recessed pattern corresponding to transfer information is transferred by electroforming, the metal plate being composed of two or more electroforming layers that are different from each other in crystal orientation; and
   a magnetic layer formed on the protruding and recessed pattern of the master substrate,
   wherein the metal plate comprises two Ni electroforming layers, and wherein of the two Ni electroforming layers, crystal orientation of a first layer constituting a surface side of the protruding and recessed pattern is preferentially oriented on Ni (220), and crystal orientation of a second layer is preferentially oriented on Ni (200).

2. The magnetic transfer master disk according to claim 1, wherein each layer thickness of the two or more layers that are different from each other in crystal orientation, are different for each layer.

3. The magnetic transfer master disk according to claim 1, wherein of the two Ni electroforming layers, when layer thickness of a first layer constituting the surface side of the protruding and recessed pattern is set to a, and layer thickness of the second layer is set to b, a/b is in the range of 0.1 to 0.25.

4. The magnetic transfer master disk according to claim 3, wherein an amount of warpage of the magnetic transfer master disk is 50 μm or less in a master disc size of 2.5 inches in diameter.

5. The magnetic transfer master disk according to claim 1, wherein an amount of warpage of the magnetic transfer master disk is 50 μm or less in a master disc size of 2.5 inches in diameter.

6. A magnetic transfer master disk comprising: a master substrate with a three layer structure of electroforming layers constituting a metal plate, on the surface of which a protruding and recessed pattern corresponding to transfer information is transferred by electroforming, in which three layer structure a first layer and a third layer have a same crystal orientation, and a second layer with a crystal orientation different from the crystal orientation of the first layer and the third layer, is sandwiched between the first layer and the third layer; and a magnetic layer formed on the protruding and recessed pattern of the master substrate, wherein at least one of the electroforming layers is a Ni electroforming layer, wherein crystal orientation of the first layer and the third layer is preferentially oriented on Ni (220), and crystal orientation of the second layer is preferentially oriented on Ni (200).

7. The magnetic transfer master disk according to claim 6, wherein each layer thickness of the first layer to the third layer which constitute the electroforming layer, is different for each layer.

8. The magnetic transfer master disk according to claim 6, wherein when layer thickness of the first layer is set to a, and layer thickness of the third layer is set to c, a/(a+c) is in the range of 0.70 to 0.85.

9. The magnetic transfer master disk according to claim 8, wherein the layer thickness relation is satisfied, and wherein the layer thickness of the third layer is 10 μm or more.

10. The magnetic transfer master disk according to claim 6, wherein amount of warpage of the magnetic transfer master disk is 50 μm or less in a 2.5 inch master disk size in diameter.

* * * * *